United States Patent
Amirthasamy et al.

(10) Patent No.: US 11,693,382 B2
(45) Date of Patent: Jul. 4, 2023

(54) METHODS AND APPARATUS TO ADJUST OPERATION OF A FLUID FLOW CONTROL ASSEMBLY

(71) Applicant: Fisher Controls International LLC, Marshalltown, IA (US)

(72) Inventors: Stanley Felix Amirthasamy, Ames, IA (US); Gregory W. Jacobs, Marshalltown, IA (US); Eric William Strong, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 174 days.

(21) Appl. No.: 17/130,983

(22) Filed: Dec. 22, 2020

(65) Prior Publication Data

US 2022/0197237 A1  Jun. 23, 2022

(51) Int. Cl.
*G05B 19/042* (2006.01)
*G05B 19/418* (2006.01)
*G05B 19/05* (2006.01)

(52) U.S. Cl.
CPC ........ *G05B 19/0428* (2013.01); *G05B 19/05* (2013.01); *G05B 19/418* (2013.01); *G05B 2219/24117* (2013.01); *G05B 2219/24211* (2013.01)

(58) Field of Classification Search
None
See application file for complete search history.

(56) References Cited

U.S. PATENT DOCUMENTS

| 10,185,291 | B2 | 1/2019 | Seberger et al. | |
|---|---|---|---|---|
| 2014/0265983 | A1* | 9/2014 | Eisenbeis | H02H 7/08 318/490 |
| 2015/0053151 | A1* | 2/2015 | Graff | F24H 9/2035 219/509 |
| 2020/0041970 | A1* | 2/2020 | Hickenlooper | A01G 25/165 |
| 2021/0325041 | A1* | 10/2021 | Urakata | F23K 3/02 |
| 2022/0052359 | A1* | 2/2022 | Fukushima | H01M 8/04302 |

\* cited by examiner

*Primary Examiner* — Kenneth M Lo
*Assistant Examiner* — Istiaque Ahmed
(74) *Attorney, Agent, or Firm* — Hanley, Flight & Zimmerman, LLC

(57) ABSTRACT

Methods and apparatus to adjust operation of a fluid flow control assembly are disclosed. An example safety valve controller apparatus includes comparator circuitry to compare a current measurement to at least one of a first threshold associated with a first flow setting of a fluid flow control assembly or a second threshold associated with a second flow setting of the fluid flow control assembly, and determine a first drive signal associated with the first flow setting or a second drive signal associated with the second flow setting in response to satisfying a respective one of the first or second thresholds, and current modulating circuitry to determine a third drive signal based on the current measurement, the third drive signal to modulate the flow setting of the fluid flow control assembly between the first and second flow settings.

23 Claims, 12 Drawing Sheets

| $R_{ETT}$ | $R_{DETT}$ | TRIP HIGH CURRENT | TRIP LOW CURRENT | THROTTLE CURRENT |
|---|---|---|---|---|
| 47K | 0 | 12mA | N/A | <12mA |
| 1M | 47K | N/A | 12mA | >12mA |
| 1M | 0 | N/A | N/A | 4-20mA |
| 90K | 24K | 16mA | 8mA | 8-16mA |
| 158K | 12.5K | 19mA | 5mA | 5-19mA |

FIG. 3B

| $R_{ETT}$ | $R_{DETT}$ | TRIP HIGH CURRENT | TRIP LOW CURRENT | THROTTLE CURRENT |
|---|---|---|---|---|
| 47K | 0 | 12mA | N/A | <12mA |
| 1M | 47K | N/A | 12mA | >12mA |
| 1M | 0 | N/A | N/A | 4-20mA |
| 90K | 24K | 16mA | 8mA | 8-16mA |
| 158K | 12.5K | 19mA | 5mA | 5-19mA |

FIG. 4B

METHODS AND APPARATUS TO ADJUST OPERATION OF A FLUID FLOW CONTROL ASSEMBLY

FIELD OF THE DISCLOSURE

This disclosure relates generally to process control and, more particularly, to methods and apparatus to adjust operation of a fluid flow control assembly.

BACKGROUND

In recent years, process control systems, like those used in chemical, petroleum, and/or other processes, have grown progressively more complex with the proliferation of newer and more advanced controllers. Such controllers may be used to monitor for potential failures of a field device during operation. Mitigation and/or prevention of such failures during operation are desirable to avoid the creation of hazardous operating conditions to process control system equipment and personnel.

SUMMARY

An example safety valve controller disclosed herein includes comparator circuitry to compare a current measurement to at least one of a first threshold associated with a first flow setting of a fluid flow control assembly or a second threshold associated with a second flow setting of the fluid flow control assembly, and determine a first drive signal associated with the first flow setting or a second drive signal associated with the second flow setting in response to the current measurement satisfying a respective one of the first threshold or the second threshold. The example safety valve controller further includes current modulating circuitry to determine a third drive signal based on the current measurement, the third drive signal to modulate the flow setting of the fluid flow control assembly between the first flow setting and the second flow setting.

An example apparatus disclosed herein includes at least one memory device and at least one processor to execute instructions to at least compare a current measurement to at least one of a first threshold associated with a first flow setting of a fluid flow control assembly or a second threshold associated with a second flow setting of the fluid flow control assembly, determine a first drive signal associated with the first flow setting or a second drive signal associated with the second flow setting when a respective one of the first threshold or the second threshold is satisfied, and determine a third drive signal based on the current measurement, the third drive signal to modulate the flow setting of the fluid flow control assembly between the first flow setting and the second flow setting.

An example method for modulating a fluid flow control assembly disclosed herein includes comparing a current measurement to a first threshold associated with a first flow setting and a second threshold associated with a second flow setting, determining a first drive signal associated with the first flow setting or a second drive signal associated with the second flow setting when a respective one of the first threshold or the second threshold is satisfied, and determining a third drive signal based on the current measurement, the third drive signal to modulate the flow setting of the fluid flow control assembly between the first flow setting and the second flow setting.

Another example apparatus disclosed herein includes a first switch having a first current terminal, a second current terminal, and a third current terminal, a second switch having a fourth current terminal, a fifth current terminal, and a sixth current terminal, and a third switch having a seventh current terminal, an eighth current terminal, and a ninth current terminal, the third current terminal of the first switch coupled to the seventh current terminal, the sixth current terminal of the second switch coupled to the eighth current terminal. The example apparatus disclosed herein further includes a first having a first comparator input terminal, a second comparator input terminal, and a first comparator output terminal, the first comparator output terminal coupled to the first current terminal of the first switch, and a second comparator having a third comparator input terminal, a fourth comparator input terminal, and a second comparator output terminal, the second comparator output terminal coupled to the fourth current terminal of the second switch.

BRIEF DESCRIPTION OF THE DRAWINGS

FIG. 3B depicts a table of first example electrical characteristics associated with the first example drive control circuit of FIG. 3A.

FIG. 4B depicts a table of second example electrical characteristics associated with the second example drive control circuit of FIG. 4A.

The figures are not to scale. In general, the same reference numbers will be used throughout the drawing(s) and accompanying written description to refer to the same or like parts.

Figure 1:
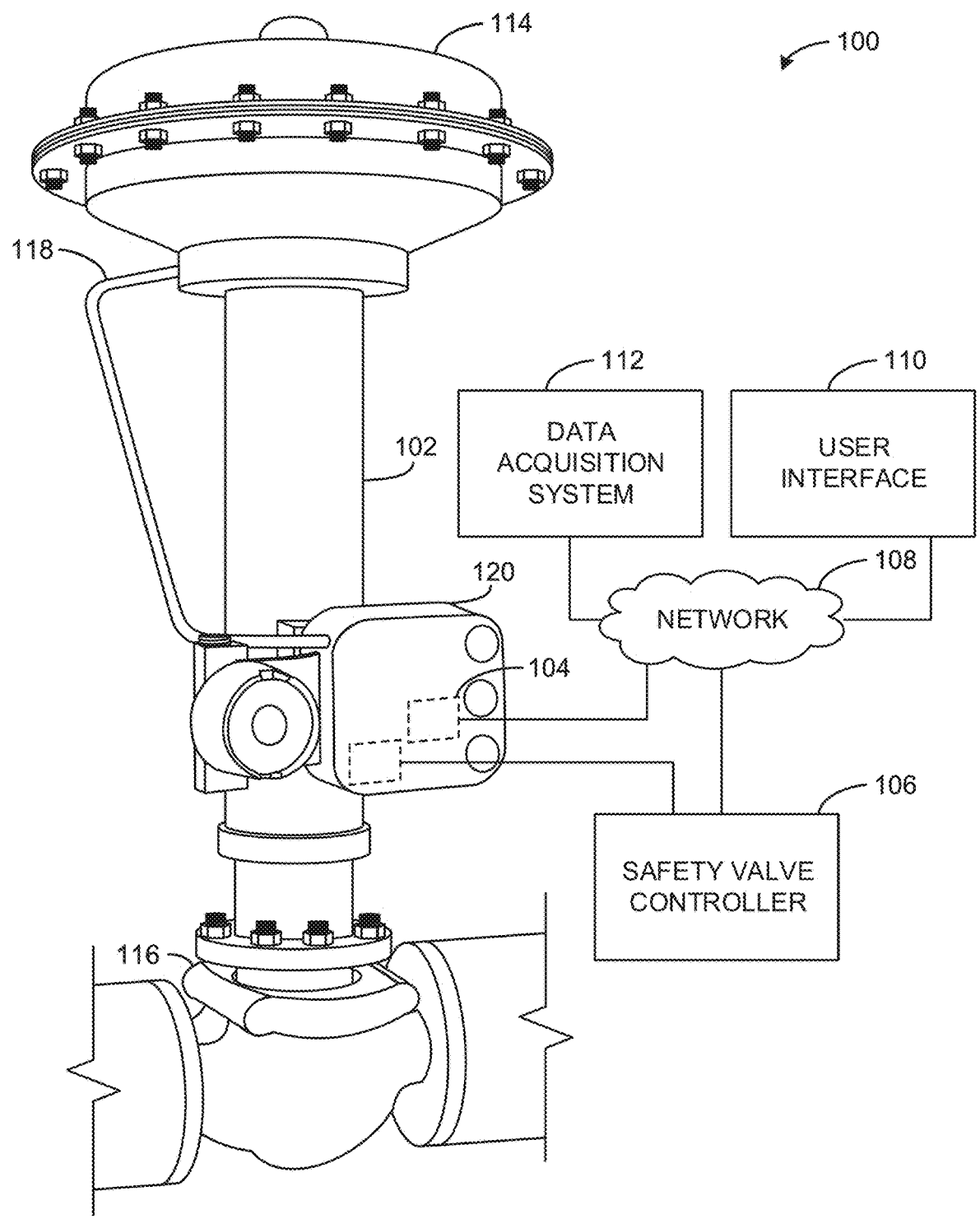
FIG. 1 illustrates an example process control system including an example fluid flow control assembly and an example safety valve controller.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Process control systems, like those used in chemical, petroleum, or other processes, may include a fluid flow control assembly to adjust flow settings (e.g., a flow rate, a fluid or mixture density, a pressure, etc.) associated with the process control system. Process control systems typically include at least one controller with associated inputs and outputs, which allow the controller(s) to acquire signals from various input devices and control various output devices.

As used herein, the term "fluid flow control assembly" refers to fluid passage devices such as, for example, pumps (e.g., hydraulic pumps, positive-displacement pumps, etc.), pump assemblies, valves (e.g., hydraulic valves, pneumatic valves, solenoid valves, etc.), valve assemblies, etc., that may be used throughout a process control system to measure and/or control different aspects (e.g., other process control devices) of the process control system. A fluid flow control assembly, such as a valve assembly, may include both electrical and mechanical components. For example, the valve assembly may include electrical components such as a digital valve positioner, a flow rate sensor, a pressure sensor, a valve controller, etc. The valve assembly may include mechanical components such as an actuator (e.g., a hydraulic actuator, a pneumatic actuator, etc.), a control connection (e.g., a hydraulic control connection, a pneumatic control connection, etc.), a mechanical housing, a process connection, etc.

The flow settings of the fluid flow control assembly are typically adjusted based on a determined state of the process control system. For instance, if the process control system is operating within a predetermined safe state, the fluid flow control assembly may maximize and/or otherwise adjust the flow settings within a pre-determined threshold of the pre-determined safe state. On the other hand, if the process control system is not operating within the predetermined safe state, a failure (e.g., a broken valve, a ruptured process pipe, a broken pump, etc.) may have occurred within the process control system and the fluid flow control assembly may minimize the flow settings and/or otherwise decrease the flow settings to safe levels to reach and/or otherwise transition to the predetermined safe state.

Process control systems may include a safety integrated system (SIS) to prevent a dangerous process control-related event, such as a release of toxic, flammable, or explosive chemicals, from occurring within the process control systems. In some process control systems, the SIS may be utilized to complement the process control systems and enable the process control systems to transition to a safe state when necessary. The SIS may execute safety instrumented functions (SIFs) to enable a process control system to maintain, or attain, operations of the process control system within the safe state.

In some instances, the SIS of the process control systems requires Safety Integrity Level (SIL) safety certification in accordance with the requirements of International Electrotechnical Commission (IEC) 61508. The SIL of the SIS is based on a frequency of failures (e.g., a quantity of failures over a period of operation) and a severity the failures (e.g., localized damage, an explosion, a toxic gas release, etc.). The SIL rating accounts for a Risk Reduction Factor (RRF) that is a ratio of the frequency of failures without operating the SIS and an acceptable frequency of the failures. The acceptable frequency of the failures is determined based on the severity of the failures. For instance, when the frequency of failures is 3 times per year and the acceptable frequency of failures is 1 every 10 years, the RRF is 30 (e.g., 30=3.0/0.1). Accordingly, SIL 1 is associated with an RRE; between 10 and 100, SIL 2 is associated with an RRF between 100 and 1,000, SIL 3 is associated with an RRF between 1,000 and 10,000, and SIL 4 is associated with an RRF between 10,000 and 100,000.

The SIS may include a fluid flow control assembly, such as a valve and actuator to adjust flow settings associated with the process control system. In some process control systems, the SIS utilizes the fluid flow control assembly to minimize (e.g., reduce) or maximize (e.g., increase) a flow of fluid through the process control system based on a determined state of the process control system and the associated SIF. In some instances, the SIS associated with the fluid flow control assembly may minimize the flow settings in response to the process control system operating within the predetermined safe state and maximize the flow settings in response to the process control system operating outside the predetermined safe state based on the SIF associated with the SIS.

Some fluid flow control assemblies are controlled by a controller that activates the fluid flow control assembly (e.g., controls an actuator to open a valve, throttle the valve, close the valve, etc.) or deactivates the fluid flow control assembly (e.g., controls an actuator to close a valve, throttle the valve, etc.) based on a determined state of the process control system. As used herein, the terms "throttle" and/or "modulate" in reference to a position of a valve or portion thereof refer to adjusting the valve or portion thereof to a position between a fully open position and a fully closed position. For example, throttling and/or modulating a valve can correspond to partially opening the valve, partially closing the valve, etc. In such examples, throttling and/or modulating the position of the valve results in a modulated and/or throttled flow setting of the fluid flow control assembly. In some instances, when the controller receives a failure indication, the controller may shut off power to a component (e.g., a drive control circuit, output control logic, etc.) associated with the fluid flow control assembly to deactivate the fluid flow control assembly. In some such instances, the process control system may lose diagnostic capabilities when power to the component is disabled.

Some fluid flow control assemblies have an activated flow setting (e.g., a flow setting when a valve is fully open and/or otherwise not closed) and a deactivated flow setting (e.g., a flow setting when a valve is fully closed and/or otherwise not open) initiated by a drive signal from an associated controller. In some instances, maintaining the activated or deactivated flow setting for an extended period of time may hinder an ability of the fluid flow control assembly to adjust the flow setting when a different drive signal is received. For instance, a valve that remains in the fully open or fully closed configuration for an extended period of time may have increased difficulty adjusting positions compared to a valve that is frequently adjusted. In some instances, an intermediate flow setting, such as a flow setting between the activated and deactivated flow settings, is desired to maintain a safe state of the process control system.

Example methods and apparatus to adjust operation of a fluid flow control assembly are disclosed herein. Examples disclosed herein include a safety valve controller communicatively coupled to a fluid flow control assembly having a flow setting determined by a drive signal. In some disclosed examples, the safety valve controller includes comparator circuitry to configure a first threshold (e.g., a first cut-off value) associated with a first flow setting of the fluid flow control assembly and/or a second threshold (e.g., a second cut-off value) associated with a second flow setting of the fluid flow control assembly. In some disclosed examples, the comparator circuitry compares a current measurement (e.g., an input current measurement, a measurement of a current that powers the fluid flow control assembly, etc.) to the first threshold and/or the second threshold. In such disclosed examples, the comparator circuitry determines a first drive signal corresponding to the first flow setting or a second drive signal corresponding to the second flow setting in response to a respective one of the first threshold or the second threshold being satisfied based on the comparison(s).

In some disclosed examples, the first flow setting associated with the first threshold and the second flow setting associated with the second threshold are determined based on the configuration of the safety valve controller. For example, the safety valve controller can be configured to energize-to-trip (ETT) and output a 0% drive signal in response to an upper threshold being satisfied or deenergize-to-trip (DETT) and output a 100% drive signal in response to the upper threshold being satisfied. In some disclosed examples, the safety valve controller includes ETT resistor(s) and DETT resistor(s) to configure the first and second thresholds. Although, in some examples, alternate components other than resistors may be used to configure the first and second thresholds. Advantageously, in some disclosed examples, the process control system can maintain diagnostic capabilities regardless of whether the fluid flow control assembly is deactivated because the example safety valve controller can output the 0% drive signal without shutting off power.

In some disclosed examples, the safety valve controller includes current modulating circuitry to determine a third drive signal based on the current measurement in response to the first threshold and the second threshold not being satisfied. Advantageously, the example current modulating circuitry can generate the third drive signal to modulate (e.g., throttle, adjust, etc.) the flow setting of the fluid flow control assembly in a range (e.g., a modulation range) from the first flow setting to the second flow setting (e.g., from the first flow setting to the second flow setting including the first flow setting and the second flow setting, between the first flow setting and the second flow setting, etc.) based on the current measurement. In some such disclosed examples, the third drive signal implements an intermediate flow setting by partially closing or opening the fluid flow control assembly based on the current measurement. Further, the example safety valve controller can generate the third drive signal to control (e.g., precisely control) the fluid flow control assembly and/or, more generally, the process control system. In some valves, a controller alternates the drive signal between the activated and deactivated flow settings (e.g., a fully open valve and a fully closed valve) to enable the intermediate flow setting. However, frequent abrupt changes in the flow setting may reduce the efficiency of the process control system.

In some disclosed examples, the safety valve controller includes an interface to receive at least one of (1) the first threshold and the first flow setting or (2) the second threshold and the second flow setting from a user interface. In some disclosed examples, the interface is in communication with the user interface via a network. In some disclosed examples, the user interface includes configurable switches that are configured by a user (e.g., a machine, a machine operator, a computing device associated with a user, etc.) to adjust the first threshold and/or the second threshold. As such, the interface can be communicatively coupled to the user interface over a wireless connection or coupling via terminals. In some examples, the configurable switches are coupled to respective ones of a set of resistors (e.g., ETT resistors, DETT resistors, etc.) and the configurable switches adjust an equivalent resistance associated with the set of the resistors to configure the first threshold and/or the second threshold. In some examples, the resistors are coupled to a comparator or an operational amplifier that is coupled to a switch to deliver the first or second drive signal to the fluid flow control assembly.

FIG. 1 illustrates an example process control system 100 including an example fluid flow control assembly 102. In the illustrated example of FIG. 1, the process control system 100 includes an example field device 104 and an example safety valve controller 106 housed in an example enclosure 120 that is coupled to the fluid flow control assembly 102. In the illustrated example of FIG. 1, the field device 104 is implemented as a valve controller. In some examples, the field device 104 and the safety valve controller 106 are in communication with an example user interface 110 and an example data acquisition system 112 via an example network 108. In the illustrated example of FIG. 1, the fluid flow control assembly 102 is a pneumatically actuated valve assembly that includes an example actuator 114, an example valve 116, and an example pneumatic connection 118. Alternatively, the fluid flow control assembly 102 may be any other type of process control related assembly (e.g., an electrically actuated valve assembly, a hydraulically actuated valve assembly, a motor, a pump, etc.).

In the illustrated example of FIG. 1 the field device 104 controls, measures, and/or monitors one or more process control operations) associated with the fluid flow control assembly 102 (e.g., a process control operation of fully opening the valve 116, calibrating the valve 116, throttling the valve 116, fully closing the valve 116, etc.). For example, the field device 104 controls, measures, and/or monitors the one or more process control operation(s) based on data (e.g., control commands, control signals, etc.). In such examples, the data can be formatted according to an industrial communication protocol and communicated to and/or from the field device 104 over an industrial communication network (e.g., the network 108). In some examples, the industrial communication protocol is a HART communication protocol, a PROFIBUS communication protocol, a FOUNDATION Fieldbus communication protocol, or a MODBUS communication protocol. Alternatively, any other industrial communication protocol may be used.

In the illustrated example of FIG. 1 the pneumatic connection 118 operatively couples the enclosure 120 to the actuator 114. For example, the field device 104 and/or the safety valve controller 106 can measure flow setting(s) associated with the actuator 114 via coupling(s) (e.g., pneumatic coupling(s)) to the pneumatic connection 118. In some examples, the enclosure 120 includes a combination of pressure gauges, logic circuits, processors, transmitters, etc., associated with the field device 104 and/or the safety valve controller 106. In some examples, the field device 104 determines a measurement (e.g., a current measurement, a voltage measurement, etc.) corresponding to a state (e.g., a safe state, a failure state, a low flow state, a high flow state, etc.) of the process control system 100, In some examples, the field device 104 receives the measurement corresponding to the state of the process control system 100 from the data acquisition system 112 (e.g., one or more programmable logic controllers, one or more computers, etc.) in communication with the network 108.

In the illustrated example of FIG. 1, the field device 104 is in communication with the safety valve controller 106. In some examples, the field device 104 communicates the measurement to the safety valve controller 106 via inter processor communication (e.g., Inter-Integrated Circuit (I2C)). In some examples, the safety valve controller 106 obtains the measurement based on a voltage across a resistor at an input of the field device 104, an input of the safety valve controller 106, etc. Additionally, in the illustrated example of FIG. 1, the safety valve controller 106 receives an input corresponding to one or more thresholds (e.g., current thresholds, trip currents, voltage thresholds, etc.) from the user interface 110 and associated flow setting(s) of the fluid flow control assembly 102. In some examples, the user interface 110 is representative of one or more graphical user interfaces (GUIs) presented on one or more display devices. In such examples, the user interface 110 obtains inputs, such as thresholds, desired flow settings, etc., and communicates the inputs to the safety valve controller 106 via the network 108. In some examples, the user interface 110 is a physical interface including configurable switches that control the thresholds and the corresponding flow settings. In such examples, the user interface 110 can be representative of one or more dip switches, toggle switches, rotary dials, etc., and/or a combination thereof.

In the illustrated example of FIG. 1, the safety valve controller 106 compares the current measurement to the thresholds and determines a drive signal corresponding to a flow setting of the fluid flow control assembly 102. In some examples, the safety valve controller 106 transmits the drive signal to the field device 104. In such examples, the field device 104 converts the drive signal (e.g., an electrical drive signal) to a pneumatic drive signal that adjusts a setting (e.g., a position) of the actuator 114 via the pneumatic connection 118. In some other examples, the pneumatic connection 118 is implemented as a pneumatic pipe, tube, etc., that can deliver changes in air pressure to the actuator 114. In such examples, the pneumatic connection 118 can include an actuator (e.g., a solenoid coupled to a pressurized source) that can be controlled via an electrical wire connection to the safety valve controller 106. Further, an adjustment of the actuator 114 adjusts a position of the valve 116 and a flow setting of the fluid flow control assembly 102. Fax example, the adjustment of the actuator 114 can be an opening of the valve 116 to increase a pressure (e.g., the flow setting) maintained by the fluid flow control assembly 102. In some examples, the valve 116 is powered externally (e.g., separate from the safety valve controller 106) for safety purposes. Alternatively, the valve 116 may not be powered externally.

In the illustrated example of FIG. 1, the safety valve controller 106 configures a first threshold associated with a first flow setting and/or a second threshold associated with a second flow setting of the fluid flow control assembly 102 based on the input from the user interface 110. In the illustrated example of FIG. 1, the safety valve controller 106 receives the current measurement form the field device 104 indicating a state of the fluid flow control assembly 102, and/or, more generally, the process control system 100. In some such examples, the safely valve controller 106 compares the current measurement to the first threshold and/or the second threshold. Further, the safety valve controller 106 determines a drive signal corresponding to a flow setting of the fluid flow control assembly 102 and/or, more specifically, the setting of the actuator 114 based on the current measurement and the first and/or second threshold. For example, the safety valve controller 106 determines a first drive signal associated with the first flow setting or a second drive signal associated with the second flow setting in response to a respective one of the first threshold or the second threshold being satisfied. Additionally, the safety valve controller 106 determines a third drive signal based on the current measurement in response to the first threshold and the second threshold not being satisfied. For example, the third drive signal can be any drive signal between the first drive signal and the second drive signal. In some examples, the third drive signal modulates the flow setting of the fluid flow control assembly 102 between the first flow setting and the second flow setting based on the current measurement. In some such examples, flow settings associated with the third drive signal correspond to a value of the current measurement in comparison to the first and second thresholds.

As used herein, a threshold and/or a cut-off being "satisfied" encapsulates conditions associated with the threshold and/or cut-off being met by a signal (e.g., a voltage, a current, etc.) to which the threshold and/or cut-off is compared. For example, an upper threshold or cut-off is "satisfied" in response to the signal in the comparison having a higher current than the upper threshold or cut-off current. Accordingly, a lower threshold or cut-off is "satisfied" in response to the signal in the comparison having a lower current than the lower threshold or cut-off.

In the illustrated example of FIG. 1, the field device 104 delivers the drive signal to the actuator 114 of the fluid flow control assembly 102 via the pneumatic connection 118. In the illustrated example, the actuator 114 is operatively coupled to the valve 116 to control the flow setting associated with the process control system 100. In the illustrated example, the actuator 114 adjusts a position of the valve 116 based on the drive signal from the field device 104. For example, the actuator 114 actuates (e.g., drives, moves, adjusts, etc.) the valve 116 to a first position associated with the first flow setting in response to receiving the first drive signal. Accordingly, the actuator 114 actuates the valve 116 to a second position associated with the second flow setting in response to receiving the second drive signal. In some examples, the first drive signal causes the actuator 114 to fully open the valve 116 and the second drive signal causes the actuator 114 to fully close the valve 116. In some such examples, the first flow setting associated with the first drive signal or the second flow setting associated with the second drive signal transitions the fluid flow control assembly 102 into a safe state. Further, the actuator 114 modulates (e.g., throttles) the valve 116 to a position between the first position and the second position in response to receiving the third drive signal. In some such examples, the valve 116 modulates the flow setting of the fluid flow control assembly 102 between the first flow setting and the second flow setting. For example, the position of the valve 116 corresponds with the current measurement received by the safety valve controller 106 and the thresholds determined by the user interface 110.

Figure 2:
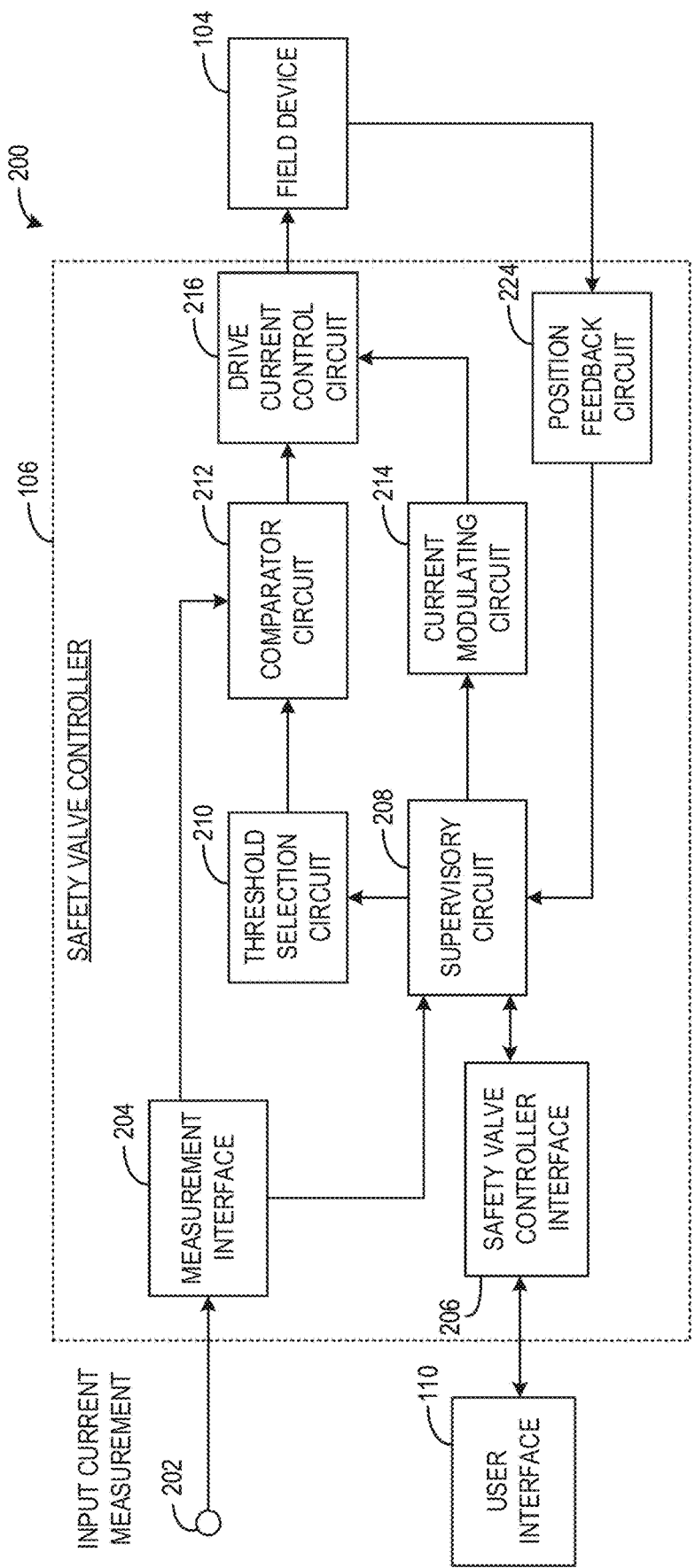
FIG. 2 is a block diagram of an example implementation of the example safety valve controller of FIG. 1 including an example security controller.

FIG. 2 is a block diagram of an example valve operation safety system 200. The valve operation safety system 200 of FIG. 2 is an example implementation of the safety valve controller 106 of FIG. 1. In the illustrated example, the safety valve controller 106 includes an example measurement interface 204, an example safety valve controller interface 206, an example supervisory circuit 208, an example threshold selection circuit 210, an example comparator circuit 212, an example current modulating circuit 214, an example drive current control circuit 216, and an example position feedback circuit 224. In the illustrated example of FIG. 2, the valve operation safety system 200 also includes an example input current measurement 202 in addition to the field device 104 and the user interface 110 of FIG. 1. For example, the input current measurement 202 may be implemented by at least one of the field device 104 or the safety valve controller 106. In some examples, the field device 104 is implemented by one or more valve controllers.

In the illustrated example of FIG. 2, the input current measurement 202 is coupled to an input terminal of the measurement interface 204. Respective output terminals of the measurement interface 204 are coupled to respective input terminals of the supervisory circuit 208 and the comparator circuit 212. The user interface 110 is coupled to an input terminal of the safety valve controller interface 206, An output terminal of the safety valve controller interface 206 is coupled to an input terminal of the supervisory circuit 208. Respective output terminals of the supervisory circuit 208 are coupled to respective input terminals of the threshold selection circuit 210 and the current modulating circuit 214. An output terminal of the threshold selection circuit 210 is coupled to an input of the comparator circuit 212. An output of the comparator circuit 212 is coupled to an input terminal of the drive current control circuit 216. Additionally, an output terminal of the current modulating circuit 214 is coupled to an input terminal of the drive current control circuit 216. An output terminal of the drive current control circuit 216 is coupled to an input terminal of the field device 104. An output terminal of the field device 104 is coupled to an input terminal of the position feedback circuit 224. An output terminal of the position feedback circuit 224 is coupled to an input terminal of the supervisory circuit 208. An output terminal of the supervisory circuit 208 is coupled to an input terminal of the safety valve controller interface 206. An output terminal of the safety valve controller interface 206 is coupled to an input terminal of the user interlace 110.

In the illustrated example of FIG. 2, the safety valve controller 106 receives the input current measurement 202 via the measurement interface 204. In some examples, the input current measurement 202 corresponds to a state of the process control system 100. In some examples, the measurement interface 204 receives the input current measurement 202 from the field device 104 and/or the network 108 of FIG. 1. In the illustrated example of FIG. 2, the measurement interface 204 provides and/or otherwise delivers the input current measurement 202 to the supervisory circuit 208 and the comparator circuit 212.

In the illustrated example of FIG. 2, the user interface 110 communicates with the safety valve controller 106 via the safety valve controller interface 206. In some examples, the user interface 110 is implemented as software (e.g., a graphical user interface (GUI) that a user (e.g., a machine, a machine operator, etc.) interacts with through a display device (e.g., a display of a tablet, a display associated with a computer, etc.) to communicate thresholds and corresponding flow settings to the safety valve controller 106. In some examples, the safety valve controller interface 206 communicates with the user interface 110 via the network 108. In some examples, the user interface 110 is coupled to the safety valve controller interface 206. For example, one or more output terminals of the user interface 110 can be coupled to one or more input terminals of the safety valve controller interface 206.

In the illustrated example of FIG. 2, the supervisory circuit 208 is coupled (e.g., communicatively coupled, electrically coupled, etc.) to the measurement interface 204 and the safety valve controller interface 206. In FIG. 2, the supervisory circuit 208 receives the input current measurement 202 from the measurement interface 204 and the thresholds determined by the user interface 110 from the safety valve controller interface 206. In some examples, the supervisory circuit 208 is implemented with firmware (e.g., embedded software) that relays the thresholds determined by the user interface 110 to the threshold selection circuit 210. In some examples, the supervisory circuit 208 relays the input current measurement 202 to the current modulating circuit 214, For example, the supervisory circuit 208 can be implemented with a processor (e.g., a microprocessor, a microcontroller, etc.) that interacts with the threshold selection circuit 210 and/or the current modulating circuit 214 through firmware to communicate and/or otherwise transmit the input current measurement 202 and/or the determined thresholds. In some examples, the supervisory circuit 208 is implemented with firmware that delivers the thresholds determined by the user interface 110 back to the user interface 110 for verification.

In some examples, the user interface 110 is implemented with hardware, such as configurable switches (e.g., DIP switches, toggle switches, rotary dials, or knobs, etc.), that the user can adjust or configure to achieve or reach desired thresholds. In some such examples, the safety valve controller interface 206 is at least partially implemented by the configurable switches of the user interface 110. For example, a user can configure (e.g., activate or deactivate) one(s) of the configurable switches of the user interface 110 to adjust a first threshold and/or a second threshold. Further, the supervisory circuit 208 obtains signals (e.g., voltages, currents, etc.) that correspond to the activation or deactivation of one(s) of the configurable switches of the user interface 110. In some examples, the supervisory circuit 208 communicates the thresholds determined by the configurable switches to the threshold selection circuit 210.

In the illustrated example of FIG. 2, the threshold selection circuit 210 configures the first threshold associated with a first flow setting of the fluid flow control assembly 102 and/or a second threshold associated with a second flow setting of the fluid flow control assembly 102 based on the input(s) from the user interface 110. In some examples, the threshold selection circuit 210 is implemented with hardware such as resistor(s) (e.g., a variable resistor(s), a bank of resistors, etc.) having a resistance or equivalent resistance that corresponds to the first threshold, the second threshold, etc. In some such examples, the threshold selection circuit 210 determines the resistance of the resistor(s) and, thus, value(s) (e.g., a current, a voltage, etc.) associated with the first threshold and/or the second threshold based on the input(s) of the user interface 110. For example, the resistor(s) of the threshold selection circuit 210 can be implemented with variable resistor(s) having a resistance controlled by the supervisory circuit 208 based on the input(s) of the user interface 110. Alternatively, the first and/or second threshold may be implemented and configured with hardware other than resistors such as amplifier(s), capacitor(s), transistor(s), etc.

In some examples, the threshold selection circuit 210 is implemented by and/or otherwise includes a set of resistors in connection with the hardware of the user interface 110, the safety valve controller interface 206, and/or the supervisory circuit 208. For example, respective ones of the configurable switches of the user interface 110, the safety valve controller interface 206, and/or the supervisory circuit 208 can be coupled to respective ones of the set of resistors of the threshold selection circuit 210. Further, respective ones of the configurable switches can be adjustable to configure a connection of the respective ones of the set of resistors and, thus, increase or decrease the resistance generated by the threshold selection circuit 210. For example, the first and/or second threshold associated with the fluid flow control assembly 102 can correspond to the resistance implemented by the set of resistors of the threshold selection circuit 210.

In the illustrated example of FIG. 2, the comparator circuit 212 is configured to receive the input current measurement 202 from the measurement interface 204. Further, the comparator circuit 212 is in circuit with the threshold selection circuit 210. In some examples, the comparator circuit 212 is configured to compare the input current measurement 202 to the first and/or second threshold generated by the threshold selection circuit 210. In the illustrated example of FIG. 2, responsive to satisfying the first or second threshold of the threshold selection circuit 210 with the input current measurement 202, the comparator circuit 212 outputs a drive signal to implement a flow setting of the fluid flow control assembly 102 associated with the respective first or second threshold. For example, the comparator circuit 212 can be configured to determine a first drive signal associated with a first flow setting responsive to satisfying the first threshold, or a second drive signal associated with a second flow setting responsive to satisfying the second threshold. In FIG. 2, the comparator circuit 212 is configured to output the first or second drive signal to the drive current control circuit 216. In some examples, a hysteresis of the comparator circuit 212 is selectable, as discussed further in association with FIG. 3A.

In the illustrated example of FIG. 2, the current modulating circuit 214 is configured to receive the input current measurement 202 from the supervisory circuit 208. In FIG. 2, the current modulating circuit 214 is configured to determine a third drive signal based on the input current measurement 202. In some such examples, the third drive signal can modulate the flow setting of the fluid flow control assembly 102 between the first and second flow settings. In some examples, the current modulating circuit 214 determines the flow setting to be implemented by the third drive signal based on a value of the input current measurement 202. For example, a first input current is associated with a first modulating flow setting and a second input current is associated with a second modulating flow setting.

In the illustrated example of FIG. 2, the drive current control circuit 216 is configured to receive the drive signal from the comparator circuit 212 or the current modulating circuit 214 based on the input current measurement 202 and associated thresholds. For example, the drive current control circuit 216 can receive the drive signal from the current modulating circuit 214 based on the input current measurement 202. Further, the drive current control circuit 216 can receive the drive signal from the comparator circuit 212 in response to the first or second threshold being satisfied. In some examples, the drive current control circuit 216 overrides the drive signal from the current modulating circuit 214 with the drive signal from the comparator circuit 212 in response to the first or second threshold being satisfied. In some such examples, the drive current control circuit 216 transmits the drive signal from the comparator circuit 212 to the field device 104. In some examples, the drive current control circuit 216 transmits the drive signal from the current modulating circuit 214 in response to the first and second threshold not being satisfied.

In the illustrated example of FIG. 2, the field device 104 controls the actuator 114 and/or the valve 116 of FIG. 1. In some examples, the field device 104 adjusts a position of the actuator 114 based on the received drive signal from the drive current control circuit 216. For example, the drive signal can adjust a pneumatic pressure in the pneumatic connection 118 to activate and/or otherwise adjust the actuator 114. Responsive to the activation, the actuator 114 can adjust a position of the valve 116 to implement the flow setting associated with the drive signal received from the drive current control circuit 216.

In the illustrated example of FIG. 2, the field device 104 monitors the position of the valve 116. For example, the field device 104 determines if the valve 116 is in a fully open position, a fully closed position, or a modulating position therebetween. Accordingly, the field device 104 determines a flow setting of the fluid flow control assembly 102 based on the determined position of the valve 116.

In the illustrated example of FIG. 2, the field device 104 transmits a current position of the valve 116 and/or an associated flow setting to the position feedback circuit 224. In some examples, the position feedback circuit 224 compares the current position of the valve and/or the associated flow setting to a position and/or flow setting determined by the drive signal from the drive current control circuit 216. In FIG. 2, the position feedback circuit 224 provides the position of the valve 116 to the supervisory circuit 208. In some examples, the supervisory circuit 208 communicates the position of the valve 116 and, thus, the flow setting of the process control system 100 to the user interface 110 via the safely valve controller interface 206. In some examples, the supervisory circuit 208 monitors a timing of a signal (e.g., a digital signal, a heartbeat signal) from the position feedback circuit 224. In some such examples, the supervisory circuit 208 compares the timing of the digital signal to a predetermined time. Further, the supervisory circuit 208 can transmit an alert to the user interface 110 via the safety valve controller interface 206 in response to the timing of the digital signal not being within the predetermined time.

In the illustrated example of FIG. 2, the supervisory circuit 208 communicates the position of the valve 116 and/or the flow setting of the process control system 100 to the current modulating circuit 214. In some such examples, the current modulating circuit 214 compares the position of the valve 116 and/or the flow setting of the process control system 100 to a position of the valve 116 and/or a flow setting of the process control system 100 that is associated with the value of the input current measurement 202. Accordingly, the current modulating circuit 214 can adjust the drive signal based on the comparison.

While an example manner of implementing the safety valve controller 106 of FIG. 1 is illustrated in FIG. 2, one or more of the elements, processes and/or devices illustrated in FIG. 2 may be combined, divided, re-arranged, omitted, eliminated and/or implemented in any other way. Further, the example measurement interface 204, the example safety valve controller interface 206, the example supervisory circuit 208, the example threshold selection circuit 210, the example comparator circuit 212, the example current modulating circuit 214, the example drive current control circuit 216 the example position feedback circuit 224, and/or, more generally, the example safety valve controller 106 of FIG. 1 may be implemented by hardware, software, firmware and/or any combination of hardware, software and/or firmware. Thus, for example, any of the example measurement interface 204, the example safety valve controller interface 206, the example supervisory circuit 208, the example threshold selection circuit 210, the example comparator circuit 212, the example current modulating circuit 214, the example drive current control circuit 216 the example position feedback circuit 224, and/or, more generally, the example safety valve controller 106 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example measurement interface 204, the example safety valve controller interface 206, the example supervisory circuit 208, the example threshold selection circuit 210, the example comparator circuit 212, the example current modulating circuit 214, the example drive current control circuit 216 and/or the example position feedback circuit 224 is/are hereby expressly defined to include a non-transitory computer readable storage device or storage disk such as a memory, a digital versatile disk (DVD), a compact disk (CD), a Blu-ray disk, etc. including the software and/or firmware. Further still, the example safety valve controller 106 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3A:
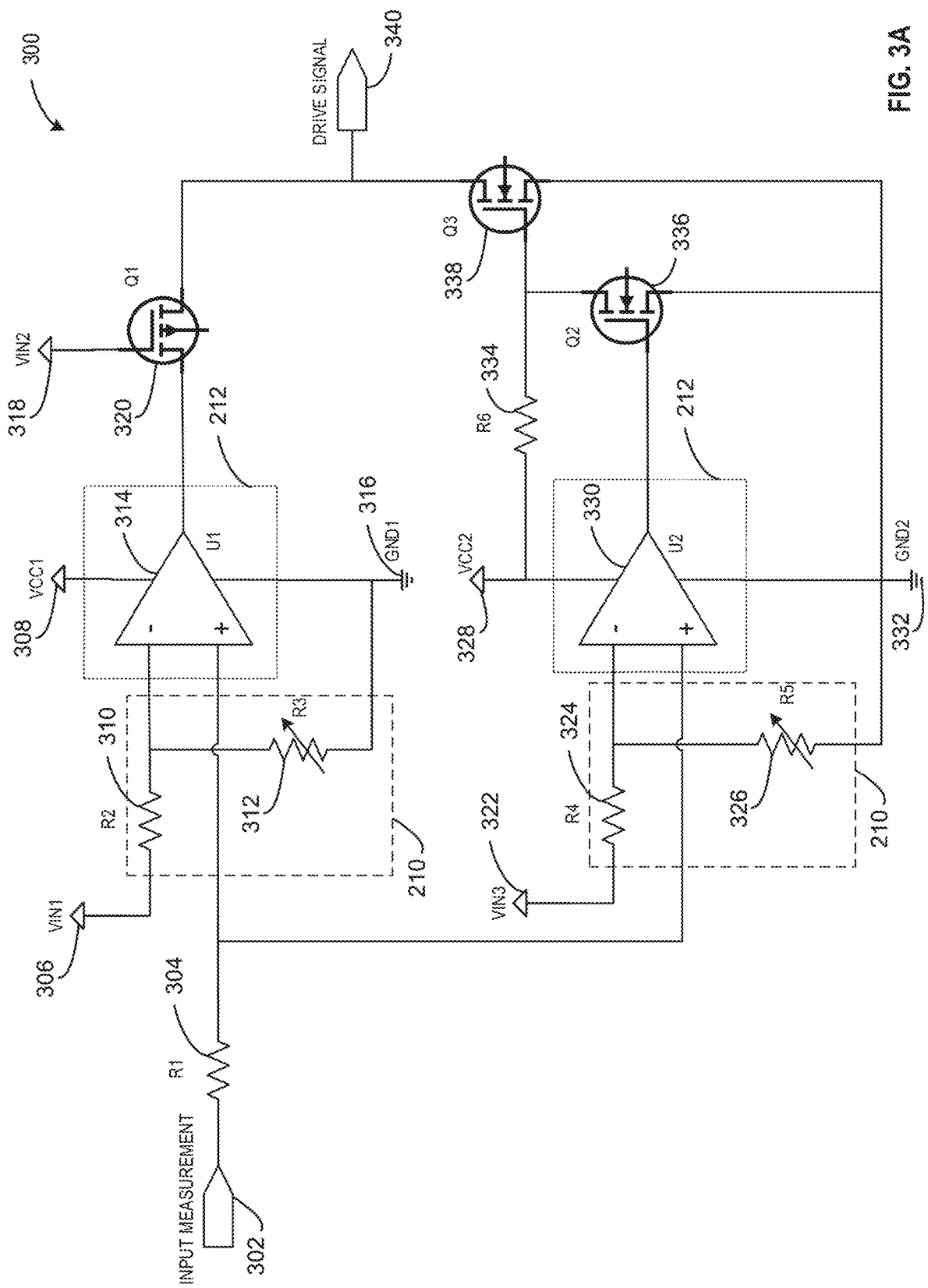
FIG. 3A is a schematic illustration of a first example drive control circuit that may implement the safety valve controller of FIGS. 1 and/or 2.

FIG. 3A is a schematic illustration of a first example drive control circuit 300 that may implement the safety valve controller 106 of FIGS. 1 and 2 or portion(s) thereof. In the illustrated example of FIG. 3A, the first drive control circuit 300 includes an example input measurement terminal 302, a first example resistor (R1) 304, a first example input voltage (VIN1) terminal 306, a first example supply voltage terminal (VCC1) 308, a second example resistor (R2) 310, a third example resistor (R3) 312, a first example comparator (e.g., a differential amplifier, a Schmitt trigger) (U1) 314, a first example ground terminal (GND1) 316, a second example input voltage terminal (VIN2), a first example switch (Q1) 320, a third example input voltage terminal (VIN3) 322, a fourth example resistor (R4) 324, a fifth example resistor (R5) 326, a second example supply voltage terminal (VCC2) 328, a second example comparator (e.g., a differential amplifier, a Schmitt trigger) (U2) 330, a second example ground terminal (GND2) 332, a sixth example resistor (R6) 334, a second example switch (Q2) 336, a third example switch (Q3) 338, and an example drive signal terminal 340.

In FIG. 3A, the threshold selection circuit 210 of FIG. 2 includes the second resistor 310, the third resistor 312, the fourth resistor 324, and the fifth resistor 326. In FIG. 3A, the comparator circuit 212 of FIG. 2 includes the first comparator 314 and the second comparator 330. Alternatively, the first and second comparators 314, 330 may be implemented as amplifiers (e.g., differential amplifiers, Schmitt triggers, etc.). The current modulating circuit 214 of FIG. 2 is not depicted in FIG. 3A. However, the current modulating circuit 214 can be implemented in the first drive control circuit 300 via a logic circuit, for example.

In this example, the first switch 320 is a P-channel metal-oxide semiconductor field-effect transistor (MOSFET). Alternatively, the first switch 320 may be a different type of transistor, such as a bipolar junction transistor (BJT) or an insulated gate bipolar transistor (IGBT). In this example, the second switch 336 and the third switch 338 are N-channel MOSFETs. Alternatively, the second switch 336 and/or the third switch 338 may be a different type of transistor, such as a BJT or an IGBT.

In the first drive control circuit 300 of FIG. 3A, the input measurement terminal 302 is coupled to a first terminal of the first resistor 304. A second terminal of the first resistor 304 is coupled to a non-inverting comparator input terminal (designated with a '+' symbol) of the first comparator 314 and anon-inverting input terminal (designated with a '+' symbol) of the second comparator 330. Further, the first input voltage terminal 306 is coupled to a first terminal of the second resistor 310. A second terminal of the second resistor 310 is coupled to a first terminal of the third resistor 312. The first terminal of the third resistor 312 is also coupled to an inverting comparator input terminal of the first comparator 314. A second terminal of the third resistor 312 is coupled to the first ground terminal 316. The first supply voltage terminal 308 is coupled to a negative power supply terminal of the first comparator 314. The first ground terminal 316 is coupled to a positive power supply terminal of the first comparator 314. The second input voltage terminal 318 is coupled to a drain terminal of the first switch 320. Further, a comparator output terminal of the first comparator 314 is coupled to a gate terminal of the first switch 320. A source terminal of the first switch 320 is coupled to a drain terminal of the third switch 338. As used herein, the terms "drain terminal" and "current terminal" are used interchangeably. As used herein, the terms "source terminal" and "current terminal" are used interchangeably. In some examples, an additional resistor is implemented to configure a hysteresis of the first comparator 314. In some such examples, a first terminal of the additional resistor is coupled to the output terminal of the first comparator 314 and a second terminal of the additional resistor is coupled to the non-inverting input terminal of the first comparator 314. Further, the additional resistor can be a variable resistor and the resistance thereof can be adjusted to configure the hysteresis of the first comparator 314.

Additionally, the third input voltage terminal 322 is coupled to a first terminal of the fourth resistor 324. A second terminal of the fourth resistor 324 is coupled to a first terminal of the of the fifth resistor 326. The first terminal of the fifth resistor 326 is also coupled to an inverting comparator input terminal of the second comparator 330. A second terminal of the fifth resistor 326 is coupled to the second ground terminal 332. The second supply voltage terminal 328 is coupled to a negative power supply terminal of the second comparator 330. The second supply voltage terminal 328 is also coupled to a first terminal of the sixth resistor 334. A second terminal of the sixth resistor 334 is coupled to a gate terminal of the third switch 338. The second ground terminal 332 is coupled to a positive power supply terminal of the second comparator 330. A comparator output terminal of the second comparator 330 is coupled to a gate terminal of the second switch 336. A source terminal of the second switch 336 is coupled to the second ground terminal 332. A drain terminal of the second switch 336 is coupled to the gate terminal of the third switch 338 and the second end of the sixth resistor 334. A source terminal of the second switch is coupled to the second ground terminal 332. The drain terminal of the third switch 338 is coupled to the drive signal terminal 340. In some examples, an additional resistor is implemented to configure a hysteresis of the second comparator 330 similar to the first comparator 314.

In example operation, the first drive control circuit 300 determines the drive signal 340 based on the input measurement 302 and thresholds. In example operation, the thresholds are determined by the third resistor 312 and the fifth resistor 326. For example, the third resistor 312 and the fifth resistor 326 have a resistance that corresponds to a first threshold and a second threshold, respectively. Further, the third resistor 312 and the fifth resistor 326 are implemented as variable resistors with resistances determined by the input from the user interface 110. In some examples, the third resistor 312 and/or the fifth resistor 326 are alternatively implemented with Field Programmable Gate Arrays (FPGAs) that are programmed to implement the first and second thresholds and retain memory after a power cycle. Alternatively, the third resistor 312 and/or the fifth resistor 326 may be implemented by any other hardware.

In example operation, the first comparator 314 is configured to compare the input measurement 302 to the first threshold determined by the third resistor 312. In example operation, the second comparator 330 is configured to compare the input measurement 302 to the second threshold determined by the fifth resistor 326. In some examples, the first comparator 314 and the second comparator 330 compare the thresholds implemented by the third resistor 312 and the fifth resistor 326, respectively, to the input measurement 302 at the respective inverting and non-inverting inputs. In some such examples, the first comparator 314 and the second comparator 330 are configured to amplify a difference between the respective inverting and non-inverting inputs thereof and, thus, determine whether the input measurement 302 satisfies the associated threshold.

In example operation, the first and second comparators 314, 330 output the difference between the respective inverting and non-inverting inputs to the first switch 320 and the second switch 336, respectively. In some such examples, the first and second switches 320, 336 communicate the outputs of the first and second comparators 314, 330 to the third switch 338. Further, the third switch 338 determines the drive signal 340 based on the comparisons between the input measurement 302 and the first and second thresholds at the first and second comparators 314, 330. In example operation, the third switch 338 delivers the drive signal 340 to the drive current control circuit 216 of FIG. 2. Further, the drive current control circuit 216 can relay the drive signal 340 to the field device 104 to implement a flow setting associated with the drive signal 340.

FIG. 3B depicts a table of first example electrical characteristics 350 associated with the first drive control circuit 300 of FIG. 3A. In FIG. 3B, the first example electrical characteristics 350 include example energize-to-trip (ETT) resistor values 352, example deenergize-to-trip (DETT) resistor values 354, example trip high current values (e.g., upper threshold current values, a first threshold, etc.) 356, example trip low current values (e.g., lower threshold current values, a second threshold, etc.) 358, and example throttle current ranges 360. In example operation, the third resistor 312 and the fifth resistor 326 implement the ETT resistor values 352 and the DETT resistor values 354, respectively. In FIG. 3B, the first electrical characteristics 350 provide resistance values of the third resistor 312 and the fifth resistor 326 of FIG. 3A to define the trip high current 356 and the trip low current 358. Further, the throttle current range 360 illustrates the input measurement 302 range between the trip high current 356 and the trip low current 358 that results in a modulated (e.g., throttled) position of the valve 116.

In example operation, a resistance of 47 kiloohms (kΩ) for the third resistor 312 and a resistance of 0 ohms (Ω) for the fifth resistor 326 configures the trip high current 356 of 12 milliamps (mA) with the trip low current 358 configured to remove and/or otherwise disable an associated drive signal and flow setting. In some such examples, in response to the input measurement 302 being less than 12 mA, the throttle current range 360 enables the drive signal 340 to modulate the position of the valve 116. Further, in response to the first drive control circuit 300 determining that the input measurement 302 is greater than 12 mA, the drive signal 340 adjusts the valve 116 to a state associated with the trip high current 356, such as a full pressure state (e.g., a fully open valve 116).

In example operation, a resistance of 1 megaohm (MΩ) fix the third resistor 312 and a resistance of 417 kΩ for the fifth resistor 326 configures the trip low current 358 of 12 mA with the trip high current 356 configured to remove and/or otherwise disable an associated drive signal and flow setting. In some such examples, in response to the input measurement 302 being greater than 12 mA, the throttle current range 360 enables the drive signal 340 to modulate the position of the valve 116. Further, responsive to the input measurement being less than 12 mA, the drive signal 340 adjusts the valve 116 to a state associated with the trip low current 358, such as a full vent state (e.g., a fully closed valve 116).

In example operation, a resistance of 1 MΩ for the third resistor 312 and a resistance of 0Ω for the fifth resistor 326 configures the trip high current 356 and the trip low current 358 to remove and/or otherwise disable associated drive signals and flow settings. In some such examples, the throttle current range 360 enables the drive signal 340 to modulate the position of the valve 116 as the input measurement 302 ranges from 4-20 mA.

In example operation, a resistance of 90 kΩ for the third resistor 312 and a resistance of 24 kΩ for the fifth resistor 326 configures the trip high current 356 to be 16 mA and the trip low current 358 to be 8 mA. In some such examples, the throttle current range 360 enables the drive signal 340 to modulate the position of the valve 116 as the input measurement 302 ranges from 8-16 mA. Further, in response to the input measurement 302 being greater than 16 mA, the drive signal 340 adjusts the valve to the state associated with the trip high current 356, such as the full pressure state (e.g., the fully open valve 116). Accordingly, in response to the input measurement 302 being less than 8 mA, the drive signal 340 adjusts the valve 116 to the state associated with the trip low current 358, such as the full vent state (e.g., the fully closed valve 116).

In example operation, a resistance of 158 kΩ for the third resistor 312 and a resistance of 12.5 kg for the fifth resistor 326 configures the trip high current 356 to be 19 mA and the trip low current 358 to be 5 mA. In some such examples, the throttle current range 360 enables the drive signal 340 to modulate the position of the valve 116 as the input measurement ranges from 5-19 mA. Further, in response to the input measurement 302 being greater than 19 mA, the drive signal 340 adjusts the valve to the state associated with the trip high current 356, such as the full pressure state (e.g., the fully open valve 116). Accordingly, in response to the input measurement 302 being less than 5 mA, the drive signal 340 adjusts the valve 116 to the state associated with the trip low current 358, such as the full vent state (e.g., the fully closed valve 116).

Figure 4A:
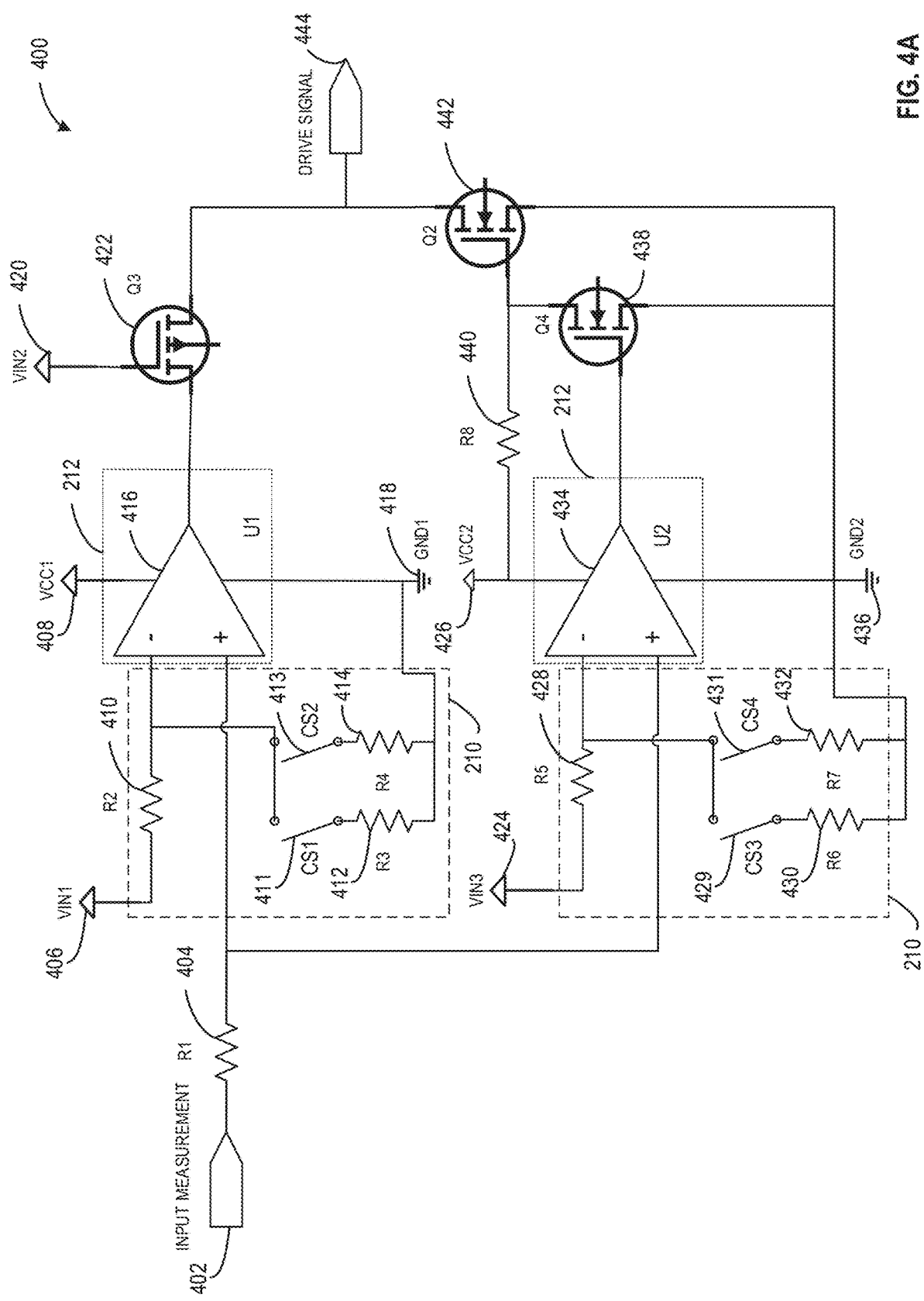
FIG. 4A is a schematic illustration of a second example drive control circuit that may implement the safety valve controller of FIGS. 1 and/or 2.

FIG. 4A is a schematic illustration of a second example drive control circuit 400 that may implement the safety valve controller 106 of FIGS. 1 and 2. In the illustrated example of FIG. 4A, the second drive control circuit 400 includes an example input measurement terminal 402, a first example resistor (R1) 404, a first example input voltage terminal (VIN1) 406, a first example supply voltage terminal (VCC1), a second example resistor (R2) 410, a first configurable switch (CS1) 411, a third example resistor (R3) 412, a second configurable switch (CS2) 413, a fourth example resistor (R4) 414, a first example comparator (U1) 416, a first example ground terminal (GND1) 418, a second example input voltage terminal (VIN2) 420, a first example switch (Q1) 422, a third example input voltage terminal (VIN3) 424, a second example supply voltage terminal (VCC2) 426, a fifth example resistor (R5) 428, a third example configurable switch (CS3) 429, a sixth example resistor (R6) 430, a fourth example configurable switch (CS4) 431, a seventh example resistor (R7) 432, a second example comparator (U2) 434, a second example ground terminal (GND2) 436, a second example switch (Q2) 438, an eighth example resistor (R8) 440, a third example switch (Q3) 442, and an example drive signal terminal 444. In some examples, the first switch 422, the second switch 438, and/or the third switch 442 are N-channel metal-oxide semiconductor field-effect transistors.

In FIG. 4A, the threshold selection circuit 210 of FIG. 2 includes the second resistor 410, the first configurable switch 411, the third resistor 412, the second configurable switch 413, the fourth resistor 414, the fifth resistor 428, the third configurable switch 429, the sixth resistor 430, the fourth configurable switch 431, and the seventh resistor 432. In FIG. 4A, the comparator circuit 212 of FIG. 2 includes the first comparator 416 and the second comparator 434. Alternatively, the first and second comparators 416, 434 may be implemented as amplifiers (e.g., differential amplifiers, Schmitt triggers, etc.). In FIG. 4A, the current modulating circuit 214 can be implemented in the second drive control circuit 400 via a logic circuit, similar to FIG. 3A.

In the second drive control circuit 400 of FIG. 4A, the input measurement terminal 402 is coupled to a first terminal of the first resistor 404. A second terminal of the first resistor 404 is coupled to a non-inverting comparator input terminal of the first comparator 416 and a non-inverting comparator input terminal of the second comparator 434. Further, the first input voltage terminal 406 is coupled to a first terminal of the second resistor 410. A second terminal of the second resistor 410 is coupled to an inverting comparator input terminal of the first comparator 416, a first terminal of the first configurable switch 411, and a second terminal of the second configurable switch 413. The first supply voltage terminal 408 is coupled to a negative power supply terminal of the first comparator 416. A second terminal of the first configurable switch 411 is coupled to a first terminal of the third resistor 412. A second terminal of the second configurable switch 413 is coupled to a first terminal of the fourth resistor 414. A second terminal of the third resistor 412, a second terminal of the fourth resistor 414, and a positive power supply terminal of the first comparator 416 are coupled to the first ground terminal 418. A comparator output terminal of the first operational amplifier is coupled to a gate terminal of the first switch 320. The second input voltage terminal 420 is coupled to a drain terminal of the first switch 422. A source terminal of the first switch 422 is coupled to a drain terminal of the third switch.

Additionally, the third input voltage terminal 424 is coupled to a first terminal of the fifth resistor 428. A second terminal of the fifth resistor is coupled to an inverting comparator input terminal of the second comparator 434, a first terminal of the third configurable switch 429, and a first terminal of the fourth configurable switch 431. A second supply voltage terminal 426 is coupled to a negative power supply terminal of the second comparator 434 and a first terminal of the eighth resistor 440. A second terminal of the third configurable switch 429 is coupled to a first terminal of the sixth resistor 430. A second terminal of the fourth configurable switch is coupled to the seventh resistor 432. A negative power supply terminal of the second comparator 434, a second terminal of the sixth resistor 430, and a second terminal of the seventh resistor 432 are coupled to the second ground terminal 436. A comparator output terminal of the second comparator 434 is coupled to a gate terminal of the second switch 438. A drain terminal of the second switch is coupled to a second terminal of the eighth resistor 440 and the gate terminal of the third switch 442. A source terminal of the second switch 438 and a source terminal of the third switch 442 are coupled to the second ground terminal 436. The drain terminal of the third switch is coupled to the drive signal terminal 444.

In example operation, the second drive control circuit 400 determines the drive signal 444 based on the input measurement 402 and implemented thresholds. In example operation, a first threshold (e.g., a trip high current) is implemented by the first configurable switch 411, the second configurable switch 413 and, more specifically, the third resistor 412 and the fourth resistor 414 coupled to the first and second configurable switches 411, 413, respectively. Further, a second threshold (e.g., a trip low current) is implemented by the third configurable switch 429, the fourth configurable switch 431 and, more specifically, the sixth resistor 430 and the seventh resistor 432 coupled to the third and fourth configurable switches 429, 431, respectively. In some examples, the user interface 110 includes the first, second, third, and fourth configurable switches 411, 413, 429, 431. In example operation, the first, second, third, and fourth configurable switches 411, 413, 429, 431 are configured at the user interface 110 to activate or deactivate associated resistors (e.g., the third resistor 412, the fourth resistor 414, the sixth resistor 430, and the seventh resistor 432). Further, the activation or deactivation of the associated resistors adjusts the first and second threshold.

In example operation, the first comparator 416 compares the input measurement 302 to the first threshold determined by the configuration of the first configurable switch 411 and the second configurable switch 413. Further, the second operational amplifier compares the input measurement 302 to the second threshold determined by the configuration of the third configurable switch 429 and the fourth configurable switch 431. In some examples, the first comparator 416 and the second comparator 434 are implemented as differential amplifiers (e.g., comparators, Schmitt triggers, etc.) that compare the thresholds to the input measurement 402 at the respective inverting and non-inverting input terminals. In some such examples, the first comparator 416 and the second comparator 434 amplify a difference between the respective inverting and non-inverting inputs thereof and, thus, determine whether the input measurement 402 satisfies the associated threshold.

In example operation, the first and second comparators 416, 434 output the difference between the respective inverting and non-inverting inputs to the first switch 422 and the second switch 438, respectively. In some such examples, the first and second switches 422, 438 transmit the outputs of the first and second comparators 416, 434 to the third switch 442. Further, the third switch 442 determines the drive signal 444 based on the comparisons between the input measurement 402 and the first and second thresholds at the first and second comparators 416, 434. In example operation, the third switch 338 delivers the drive signal 340 to the fluid flow control assembly 102 to implement a flow setting associated with the drive signal 340.

FIG. 4B depicts a table of second example electrical characteristics 450 associated with the second example drive control circuit of FIG. 4A. In FIG. 4B, the electrical characteristics 450 include example energize-to-trip (ETT) resistor values 452, example deenergize-to-trip (DETT) resistor values 454, example trip high current values (e.g., upper threshold current values, a first threshold, etc.) 456, example trip low current values (e.g., lower threshold current values, a second threshold, etc.) 458, and example throttle current ranges 460. In example operation, the second resistor 410, the third resistor 412, and the fourth resistor 414 of FIG. 4A implement the ETT resistor values 452. Additionally, the fifth resistor 428, the sixth resistor 430, and the seventh resistor 432 of FIG. 4A implement the DETT resistor values 454. In FIG. 4B, the electrical characteristics 450 provide an equivalent resistance of the second resistor 410, the third resistor 412, and the fourth resistor 414 to define the trip high current 456. In FIG. 4B, the electrical characteristics 450 also provide an equivalent resistance of the fifth resistor 428, the sixth resistor 430, and the seventh resistor 432 to define the trip low current 458. Further, the throttle current range 460 illustrates the input measurement 402 range between the trip high current 456 and the trip low current 458 that results in a modulated (e.g., throttled) position of the valve 116.

In example operation, an equivalent resistance of 47 kΩ for the second resistor 410, the third resistor 412, and the fourth resistor 414 configures the trip high current 456 of 12 mA. Further, an equivalent resistance of 0Ω for fifth resistor 428, the sixth resistor 430, and the seventh resistor 432 configures the trip low current 458 to remove and/or otherwise disable an associated drive signal and flow setting. In some examples, in response to the input measurement 402 being less than 12 mA, the throttle current range 460 enables the drive signal 444 to modulate the position of the valve 116. Further, in response to the second drive control circuit 400 determining that the input measurement 402 is greater than 12 mA, the drive signal 444 adjusts the valve 116 to a state associated with the trip high current 456, such as a full pressure state (e.g., a fully open valve 116).

In example operation, an equivalent resistance of 1 MΩ for the second resistor 410, the third resistor 412, and the fourth resistor 414 configures the trip high current 456 to remove and/or otherwise disable an associated drive signal and flow setting. Further, an equivalent resistance of 47 kΩ for fifth resistor 428, the sixth resistor 430, and the seventh resistor 432 configures the trip low current 458 of 12 mA. In some examples, in response to the input measurement 402 being greater than 12 mA, the throttle current range 460 enables the drive signal 444 to modulate the position of the valve 116. Further, in response to the input measurement being less than 12 mA, the drive signal 444 adjusts the valve 116 to a state associated with the trip low current 458, such as a full vent state (e.g., a fully closed valve 116).

In example operation, an equivalent resistance of 1 MΩ for the second resistor 410, the third resistor 412, and the fourth resistor 414 and an equivalent resistance of 0Ω for the fifth resistor 428, the sixth resistor 430, and the seventh resistor 432 configures the trip high current 456 and the trip low current 458 to remove and/or otherwise disable associated drive signals and flow settings. In some such examples, the throttle current range 460 enables the drive signal 444 to modulate the position of the valve 116 as the input measurement 402 ranges from 4-20 mA.

In example operation, an equivalent resistance of 90 kΩ for the second resistor 410, the third resistor 412, and the fourth resistor 414 configures the trip high current 456 to be 16 mA. Further, an equivalent resistance of 24 kΩ for the fifth resistor 428, the sixth resistor 430, and the seventh resistor 432 configures the trip low current 458 to be 8 mA. In some such examples, the throttle current range 460 enables the drive signal 444 to modulate the position of the valve 116 as the input measurement 402 ranges from 8-16 mA. Further, in response to the input measurement 402 being greater than 16 mA, the drive signal 444 adjusts the valve 116 to the state associated with the trip high current 456, such as the full pressure state (e.g., the fully open valve 116). Accordingly, in response to the input measurement 402 being less than 8 mA, the drive signal 444 adjusts the valve to the state associated with the trip low current 458, such as the full vent state (e.g., the fully closed valve 116).

In example operation, an equivalent resistance of 158 kΩ for the second resistor 410, the third resistor 412, and the fourth resistor 414 configures the trip high current 456 to be 19 mA. Further, an equivalent resistance of 12.5 kΩ for the fifth resistor 428, the sixth resistor 430, and the seventh resistor 432 configures the nip low current 458 to be 5 mA. In some such examples, the throttle current range 460 enables the drive signal 444 to modulate the position of the valve 116 as the input measurement ranges from 5-19 mA. Further, in response to the input measurement 402 being greater than 19 mA, the drive signal 444 adjusts the valve to the state associated with the trip high current 456, such as the full pressure state (e.g., the fully open valve 116). Accordingly, in response to the input measurement 402 being less than 5 mA, the drive signal 444 adjusts the valve 116 to the state associated with the trip low current 458, such as the full vent state (e.g., the fully closed valve 116).

Figure 5:
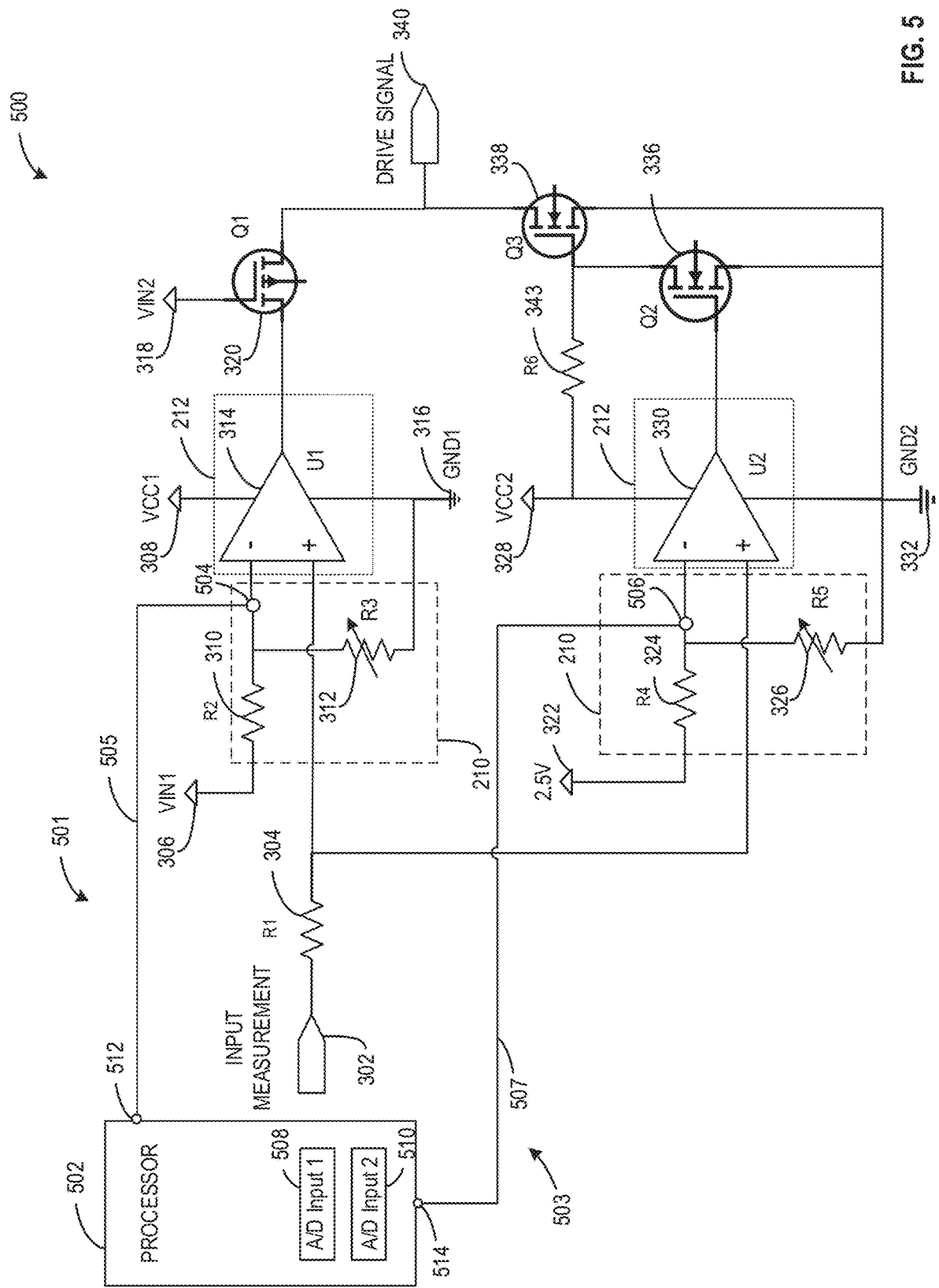
FIG. 5 is a schematic illustration of a first example circuit including the first example drive control circuit of FIG. 3A and first example diagnostic circuitry that may implement the example safety valve controller of FIGS. 1 and/or 2.

FIG. 5 is a schematic illustration of a first example circuit 500 including the first example drive control circuit 300 of FIG. 3A and first example diagnostic circuitry 501, 503 that may implement the example safety valve controller 106 of FIGS. 1 and 2. In this example, the first diagnostic circuitry includes a first example diagnostic circuit 501 that corresponds to a first example electrical coupling (e.g., a first wire) 505 between an example processor 502 and a first example node (e.g., a measurement node, a diagnostic node, etc.) 504. Further, the first diagnostic circuitry includes a second example diagnostic circuit 503 that corresponds to a second example electrical coupling (e.g., a second wire) 507 between the processor 502 and a second example node (e.g., a measurement node, a diagnostic node, etc.) 506. In FIG. 5, the processor 502 includes a first example analog-to-digital (A/D) input 508 and a second example A/D input 510. In FIG. 5, the processor 502 also includes a first example input terminal 512 and a second example input terminal 514 coupled to the first node 504 and the second node 506, respectively. In example operation, the processor 502 is configured to measure a current of the drive control circuit 300 generated at the first and second nodes 504, 506.

In some examples, the processor 502 is configured to receive a first voltage value (e.g., a first reference voltage) of the first drive control circuit 300 at the inverting input of the first comparator 314 via the first node 504. In some examples, the processor 502 receives the first voltage value via the first input 512. In some examples, the first input 512 is coupled to the first A/D input 508 which converts the first voltage value to a digital signal for the processor 502 to analyze. In some examples, the processor 502 is configured to receive a second voltage value (e.g., a second reference voltage) of the first drive control circuit 300 at the inverting input of the second comparator 330 via the second node 506. In some examples, the processor 502 is configured to receive the second voltage value at the second input terminal 514 via the second node 506. In some examples, the second input 514 is coupled to the second A/D input 510, which converts the second voltage value to a digital value (e.g., a binary value, a hexadecimal value, etc.).

In some examples, the processor 502 is configured to analyze the first and second voltage values at the first and second nodes 504, 506 to determine the trip high current 356 and/or the trip low current 358 associated with the first drive control circuit 300. In some examples, the processor 502 is configured to transmit the determined trip high current 356 and trip low current 358 to the user interface 110. In some such examples, an operator (e.g., a machine, a machine operator, etc.) confirms the trip high current 356 and the trip low current 358 or enters an alternative trip high current 356 and trip low current 358 to be implemented by the drive control circuit 300.

Figure 6:
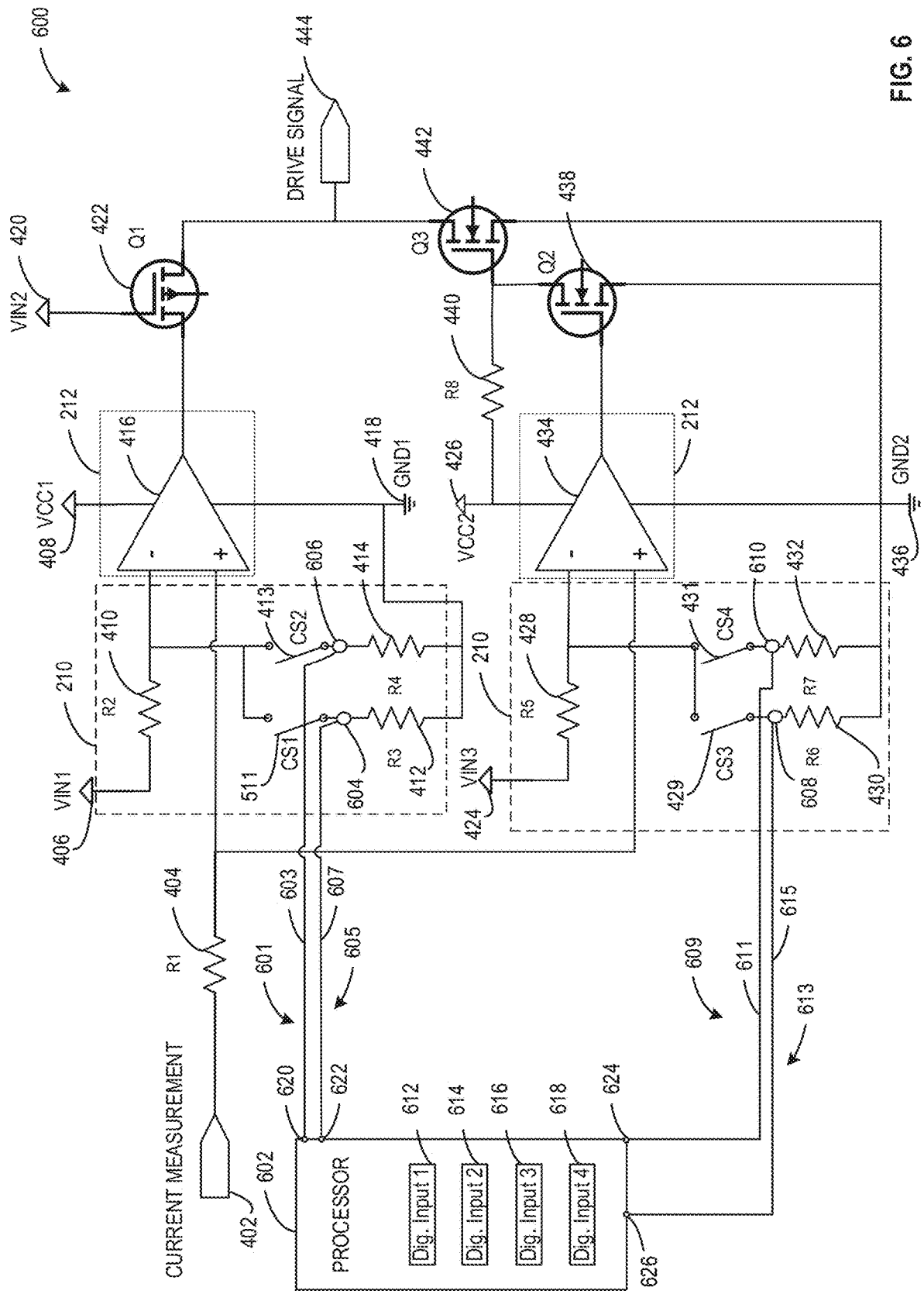
FIG. 6 is a schematic illustration of a second example circuit including the second example drive control circuit of FIG. 4A and second example diagnostic circuitry that may implement the safety valve controller of FIGS. 1 and/or 2.

FIG. 6 is a schematic illustration of a second example circuit 600 including the second example drive control circuit 400 of FIG. 4A and second example diagnostic circuitry 601, 605, 609, 613 that may implement the safety valve controller 106 of FIGS. 1 and 2, In FIG. 6, the diagnostic circuitry includes a first example diagnostic circuit 601 that corresponds to a first example electrical coupling (e.g., a first wire) 603 between an example processor 602 and a first example node 604 and a second example diagnostic circuit 605 that corresponds to a second electrical coupling (e.g., a second wire) 607 between the processor 602 and a second example node 606. Further, the diagnostic circuitry includes a third example diagnostic circuit 609 that corresponds to a third electrical coupling (e.g., a third wire) 611 between the processor 602 and a third example node 608 and a fourth example diagnostic circuit 613 that corresponds to a fourth electrical coupling (e.g., a fourth wire) 615 between the processor 602 and a fourth example node 610. In FIG. 6, the processor 602 includes a first example digital input 612, a second example digital input 614, a third example digital input 616, and a fourth example digital input 618. In FIG. 6, the processor 602 further includes a first example input 620, a second example input 622, a third example input 624, and a fourth example input 626 coupled to the first, second, third, and fourth electrical couplings 603, 607, 611, 615, respectively. In example operation, the processor 602 is configured to measure a current of the second drive control circuit 400 at the first, second, third, and fourth nodes 604, 606, 608, 610.

In some examples, the first node 604 and the second node 606 are coupled to the second terminal of the third resistor 412 and the second terminal of the fourth resistor 414, respectively. In some examples, the processor 602 is configured to receive voltage values (e.g., reference voltages) of the second drive control circuit 400 at the second terminals of the third and fourth resistors 412, 414 via the first and second node 604, 606, respectively. In some examples, the processor 602 is configured to receive the voltage values generated at the first and second node 604, 606 via, the first input 620 and the second input 622. In some examples, the first input 620 is coupled to the first digital input 612 and the second input is coupled to the second digital input 614. In some examples, the processor 602 is configured to analyze the voltages generated at the first and second nodes 604, 606 to determine the trip high current 456 implemented by the second drive control circuit 400. For example, the processor 602 determines a configuration of the first and second configurable switches 411, 413 in connection with the third and fourth resistors 412, 414 to determine the trip high current 456.

In some examples, the third node 608 and the fourth node 610 are coupled to the second terminal of the sixth resistor 430 and the second terminal of the seventh resistor 432, respectively. In some examples, the processor 602 is configured to receive voltage values (e.g., reference voltages) of the second drive control circuit 400 at the sixth and seventh resistors 430, 432 via the third and fourth nodes 608, 610, respectively. In some examples, the processor 602 is configured to receive the voltage values generated at the third and fourth nodes 608, 610 via the third input 624 and the fourth input 626, respectively. In some examples, the third and fourth inputs 624, 626 are coupled to the third digital input 616 and the fourth digital input 618, respectively. In some examples, the processor 602 is configured to analyze the voltage values generated al the third and fourth nodes 608, 610 to determine the trip low current 458 implemented by the second drive control circuit 400. For example, the processor 602 is configured to measure voltages generated at the third and fourth nodes 608, 610 to determine if the associated third and fourth configurable switches 429, 431 are configured to implement the associated sixth and seventh resistors 430, 432. In some examples, the processor 602 is configured to analyze the voltages generated at the nodes 604, 606, 608, 610 to determine the trip high current 456, the trip low current 458, and the throttle current range 460 of the second drive control circuit 400.

In some examples, the processor 602 is configured to transmit the determined trip high current 456, trip low current 458, and throttle current range 460 to the user interface 110. In some such examples, an operator (e.g., a machine, a machine operator, etc.) confirms the trip high current 456, the trip low current 458, and the throttle current range 460 or enters an alternative trip high current 456 and trip low current 458 to be implemented by the second drive control circuit 400. In some examples, the operator adjusts the configuration of the configurable switches 411, 413, 429, 431 to adjust the trip high current 456, the trip low current 458, and the throttle current range 460.

Figure 7:
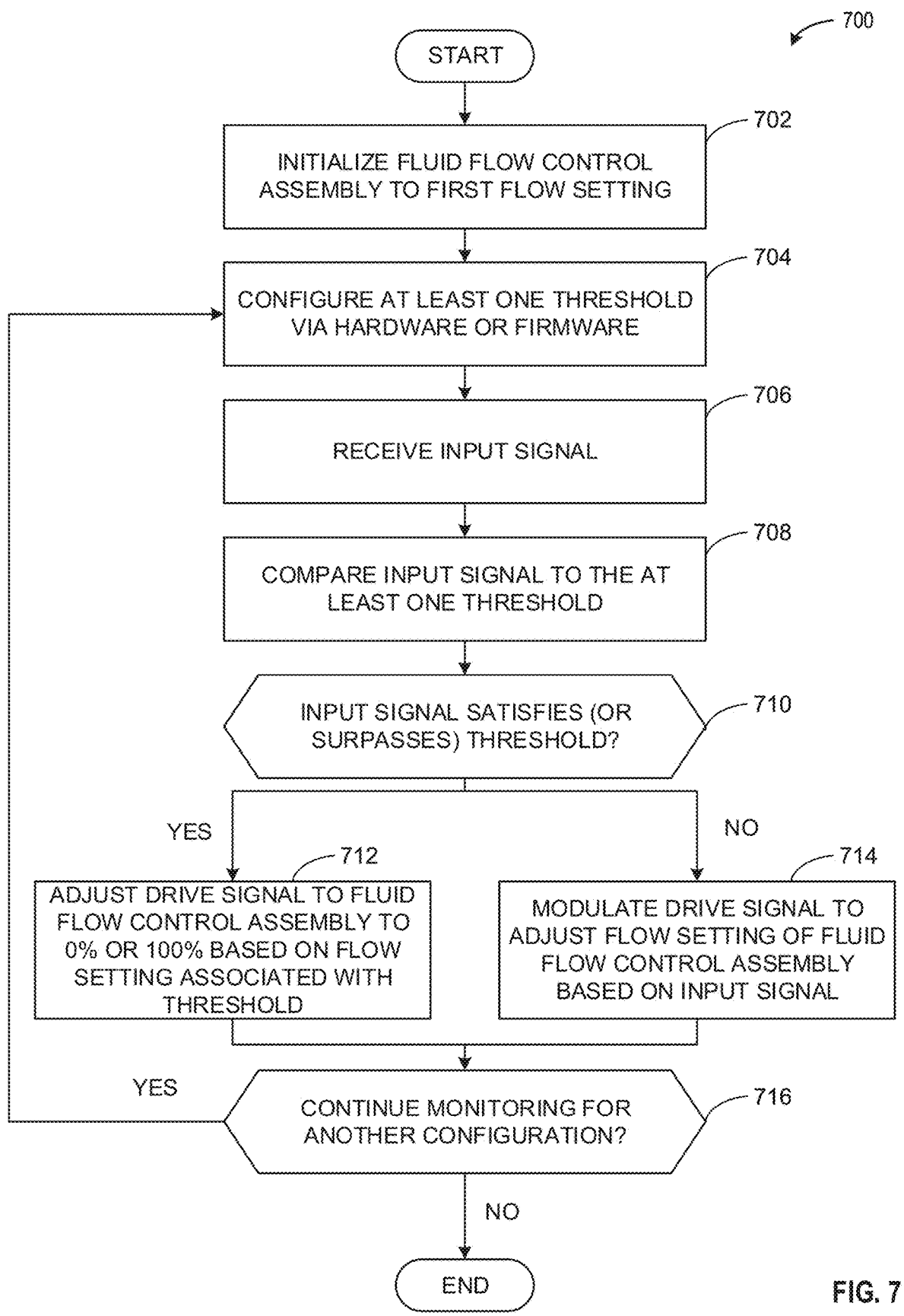
FIG. 7 is a flowchart representative of example machine readable instructions that may be executed to implement the example safety valve controller of FIGS. 1, 2, 3, and/or 4 to adjust operations of the example fluid flow control assembly.
Figure 8:
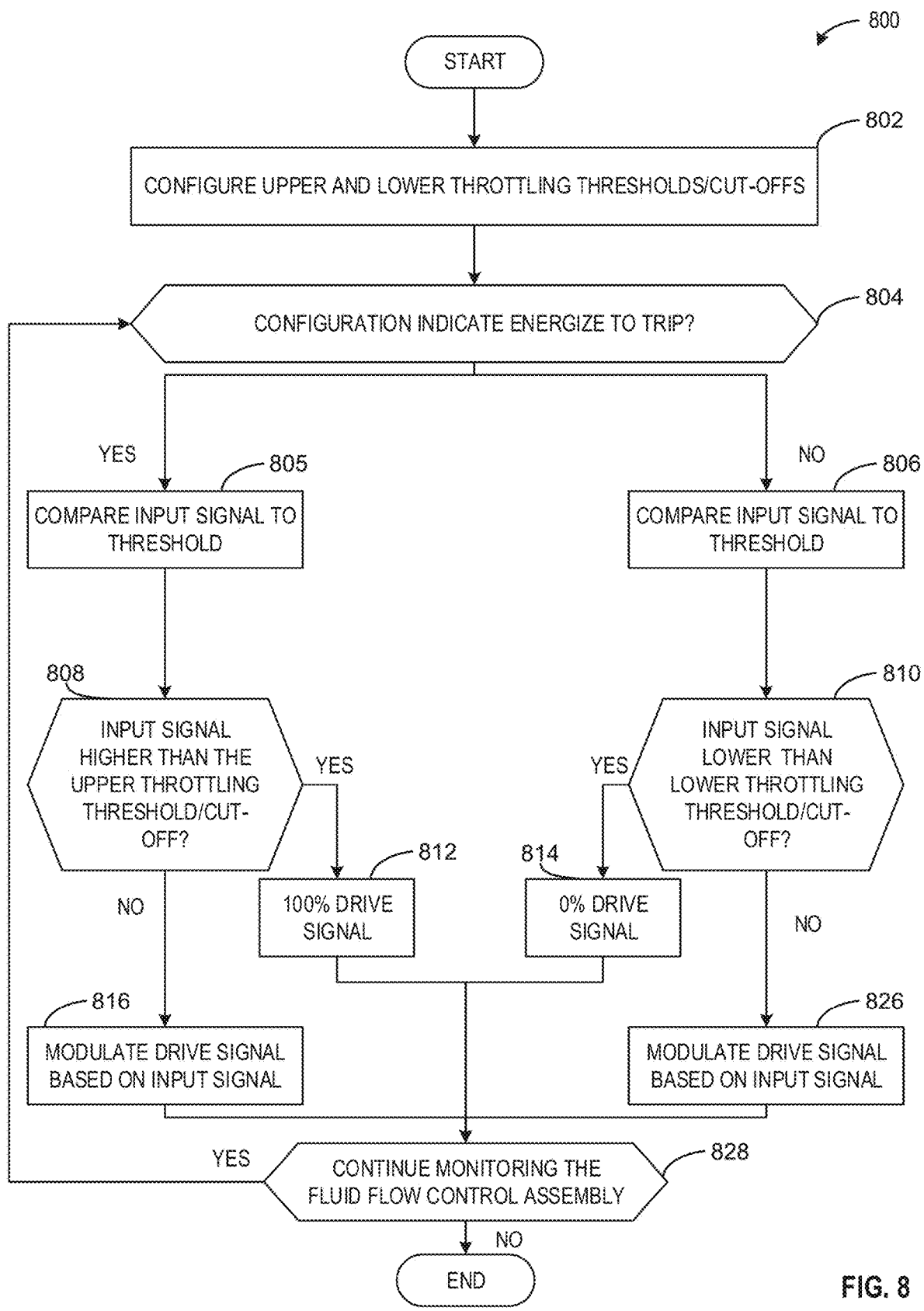
FIG. 8 is a flowchart representative of example machine readable instructions that may be executed to implement the example security controller of FIGS. 2A and/or 2B, and/or, more generally, the example safety valve controller of FIGS. 1 and/or 2 to authenticate inputs received by the example fluid flow control assembly of FIG. 1.

Flowcharts representative of example hardware logic, machine readable instructions, hardware implemented state machines, and/or any combination thereof for implementing the safety valve controller 106 of FIGS. 1 and/or 2 is shown in FIGS. 7-8. The machine readable instructions may be one or more executable programs or portion(s) of an executable program for execution by a computer processor and/or processor circuitry, such as the processor 912 shown in the example processor platform 900 discussed below in connection with FIG. 9. The program may be embodied in software stored on a non-transitory computer readable storage medium such as a volatile memory, a non-volatile memory (e.g., flash memory), or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 7-8, many other methods of implementing the example safety valve controller 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a, dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, CH++, Java, Perl, Python, JavaScript, HyperText Markup Language (HTML), Structured Query Language (SQL), Swift, etc.

As mentioned above, the example processes of FIGS. 7-8 may be implemented, using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 7 is a first flowchart representative of example machine executable instructions 700 that may be executed to implement the example safety valve controller 106 of FIGS. 1 and/or 2 to adjust operations of the example fluid flow control assembly 102 of FIG. 1. The example machine readable instructions 700 begin at block 702, at which the safety valve controller 106 initializes the fluid flow control assembly 102 to a first flow setting. For example, the first flow selling can be a full pressure state (e.g., a fully open valve 116). In such examples, the drive current control circuit 216 (FIG. 2) can transmit a drive signal corresponding to the full pressure state to the field device 104. In such examples, the field device 104 transmits the drive signal to the actuator 114 of the fluid flow control assembly 102 via the pneumatic connection 118. In such examples, the actuator 114 is operatively coupled to the valve 116 to control the flow setting associated with the process control system 100.

At block 704, the safety valve controller 106 configures at least one threshold via hardware or firmware. In some examples, the safety valve controller 106 configures the at least one threshold based on an input from the user interface 110. For example, when the user interface 110 is implemented as software, the safety valve controller 106 can configure the at least one threshold based on input(s) from a user that interacts with the user interface 110 via a display device. In such examples, the supervisory circuit 208 can execute firmware to deliver the thresholds to the threshold selection circuit 210 to cause the threshold selection circuit 210 to configure a resistance of the third resistor 312 and/or the fifth resistor 326 to implement the thresholds determined by the user interface 110.

In some examples, when the user interface 110 is implemented as hardware, a user can configure the configurable switches 411, 413, 429, 431 of FIG. 4A to adjust the at least one threshold. For example, the first configurable switch 411 can activate or deactivate the third resistor 412 to adjust a threshold implemented by the second drive control circuit 400. In some examples, the supervisory circuit 208 executes firmware to transmit the configured thresholds back to the user interface 110 for verification.

At block 706, the safety valve controller 106 receives an input signal (e.g., the input current measurement 202, the input measurement 302, the input measurement 402). For example, the measurement interface 204 (FIG. 2) can transmit the input current measurement 202 to the supervisory circuit 208 and the comparator circuit 212. In such examples, the supervisory circuit 208 transmits the input current measurement 202 to the current modulating circuit 214.

At block 708, the safety valve controller 106 compares the input signal to the at least one threshold. For example, the comparator circuit 212 and/or the current modulating circuit 214 compares the input current measurement 202 to the at least one threshold of the threshold selection circuit 210. In such examples, the first comparator 314, 416 and the second comparator 330, 434 of FIGS. 3A and 4A amplify a difference between the input measurement 302, 402 and the at least one threshold.

At block 710, the safety valve controller 106 determines if the input signal satisfies (e.g., surpasses) at least one threshold. For example, the comparator circuit 212 determines if the at least one threshold is satisfied based on the outputs of the first comparator 314, 416 and the second comparator 330, 434 of the associated drive control circuit 300, 400.

At block 712, in response to the safety valve controller 106 determining that the input signal satisfies at least one threshold at block 710, the safety valve controller 106 adjusts a drive signal to the fluid flow control assembly 102 to 0% (e.g., a fully closed valve 116) or 100% (e.g., a fully open valve 116) based on the flow setting associated with the satisfied threshold. For example, the comparator circuit 212 delivers an indication of the satisfied threshold to the drive current control circuit 216 and the drive current control circuit 216 transmits the drive signal associated with the satisfied threshold to the field device 104. In such examples, the indication of the satisfied threshold from the comparator circuit 212 overrides a drive signal that the drive current control circuit 216 receives from the current modulating circuit 214. Further, the first switch 320, 422 or the second switch 336, 438 indicates whether the input measurement 302, 402 satisfies an associated threshold to the third switch 338, 442 of the drive control circuit 300, 400. In turn, the third switch 338, 442 transmits the drive signal 340, 444 to the drive current control circuit 216 based on the indication from the first switch 320, 422 and/or the second switch 336, 438.

In some examples, in response to the comparator circuit 212 determining that a high threshold (e.g., a trip high current 456) is satisfied, the drive current control circuit 216 transmits a 100% drive signal to the field device 104. In some examples, in response to the comparator circuit 212 determining that a low threshold (e.g., a trip low current 458) is satisfied, the drive current control circuit 216 transmits a 0% drive signal to the field device 104. Further, the field device 104 transmits a pneumatic drive signal to the actuator 114 via the pneumatic connection 118. In such examples, the actuator 114 actuates (e.g., adjusts) the position of the valve 116 to implement the flow setting associated with the drive signal. For example, the actuator 114 fully opens the valve 116 to implement a full pressure flow setting or fully closes to the valve 116 to implement a full vent flow setting.

At block 714, in response to the safety valve controller 106 determining that the input signal does not satisfy at least one threshold at block 710, the safety valve controller 106 modulates the drive signal to adjust the flow setting of the fluid flow control assembly 102 based on the input signal. For example, the current modulating circuit 214 determines a modulated drive signal (e.g., a drive signal between 0% and 100%) based on the input current measurement 202. In some examples, the current modulating circuit 214 transmits the modulated drive signal to the drive current control circuit 216. In such examples, the drive current control circuit 216 transmits the modulated drive signal to the field device 104, which transmits the modulated drive signal to the actuator 114 via the pneumatic connection 118. In such examples, the actuator 114 adjusts the position of the valve 116 to implement a modulated flow setting associated with the modulated drive signal. For example, the actuator 114 partially opens or partially closes the valve 116 to implement the modulated flow setting.

In some examples, the position feedback circuit 224 transmits the position of the valve 116 to the supervisory circuit 208. In such examples, the supervisory circuit 208 transmits the position of the valve 116 to the current modulating circuit 214. Further, the current modulating circuit 214 can determine if the position of the valve 116 correlates with the flow setting associated with the input current measurement 202. In some examples, the supervisory circuit 208 transmits the position of the valve 116 and/or the implemented flow setting to the user interface 110. In such examples, the user confirms the flow setting or delivers an alternate flow setting to the safety valve controller interface 206 and the supervisory circuit 208 via the user interface 110.

At block 716, the safety valve controller 106 determines whether to continue monitoring for another configuration of the at least one threshold. In some examples, the safety valve controller 106 returns to block 704 to continue monitoring for another configuration and configure at least one threshold via hardware or firmware. In some examples, the safety valve controller 106 halts monitoring for another configuration, FIG. 8 is a second flowchart representative of example machine executable instructions 800 that may be executed to implement the example safety valve controller 106 of FIGS. 1 and/or 2 to operate and/or otherwise control the fluid flow control assembly 102. In FIG. 8, the example machine executable instructions 800 represent an alternative method of implementing the safety valve controller 106 that is separate from the machine executable instructions 700 of FIG. 7. The example machine executable instructions 800 begin at block 802, at which the safety valve controller 106 configures upper and lower throttling thresholds and/or cut-offs. For example, an operator (e.g., a machine, a machine operator, etc.) configures upper and lower throttling thresholds and/or cut-offs at the user interface 110. In some examples, the safety valve controller 106 receives the thresholds and/or cut-offs at the safety valve controller interface 206, which transmits the thresholds and/or cut-offs to the supervisory circuit 208. In such examples, the supervisory circuit 208 transmits the thresholds and/or cut-offs to the threshold selection circuit 210, which configures the upper and lower throttling thresholds and/or cut-offs. For example, the threshold selection circuit 210 adjusts a resistance(s) in the drive control circuit 300, 400 to implement the thresholds determined by the operator.

At block 804, the safety valve controller 106 determines whether the configuration of the upper and lower throttling thresholds and/or cut-offs indicates energize-to-trip (ETT) or deenergize-to-trip (DETT) thresholds. For example, the threshold selection circuit 210 determines if the upper and/or lower throttling thresholds and/or cut-offs are to be implemented as ETT or DETT thresholds. In such examples, the threshold selection circuit 210 determines whether the configuration indicates an ETT or DETT threshold and/or cut-off based on the resistance(s) in the drive control circuit 300, 400.

At block 805, in response to the operator implementing the ETT throttling threshold, the safety valve controller 106 compares the input signal to the upper throttling threshold and/or cut-off. For example, the comparator circuit 212 compares the input current measurement 202 to the upper throttling threshold and/or cut-off configured by the threshold selection circuit 210. In some examples, in response to comparing the input signal to the upper throttling threshold and/or cut-off, the machine executable instructions 800 continue to block 808.

At block 806, in response to the operator implementing the DETT throttling threshold, the safety valve controller 106 compares the input signal to the lower throttling threshold and/or cut-off. For example, the comparator circuit 212 compares the input current measurement 202 to the lower throttling threshold and/or cut-off configured by the threshold selection circuit 210. In some examples, in response to comparing the input signal to the lower throttling threshold and/or cut-off, the machine executable instructions 800 continue to block 810.

At block 808, in response to the threshold selection circuit 210 comparing the input signal to the ETT throttling threshold and/or cut-off, the safety valve controller 106 determines whether the input signal is higher (e.g., has a higher current value) than the upper throttling threshold and/or cut-off. In some examples, when the input signal is higher than the upper throttling threshold and/or cut-off, the machine executable instructions 800 continue to block 812. In some examples, if the input signal is lower (e.g., has a lower current value) than the upper throttling threshold and/or cut-off, the machine executable instructions 800 continue to block 816.

At block 810, in response to the threshold selection circuit 210 comparing the input signal to the DETT throttling threshold and/or cut-off, the safety valve controller 106 determines whether the input signal is lower than the lower throttling threshold and/or cut-off. In some examples, in response to the input signal being lower than the lower throttling threshold and/or cut-off, the machine executable instructions continue to block 814. In some examples, in response to the input signal being higher than the lower throttling threshold and/or cut-off, the machine executable instructions 800 continue to block 818.

At block 812, the safety valve controller 106 transmits a 100% drive signal in response to determining that the input signal is higher than the upper throttling threshold and/or cut-off. For example, the comparator circuit 212 transmits the 100% drive signal to the drive current control circuit 216, which delivers the 100% drive signal to the field device 104. In some examples, the field device 104 transmits the 100% drive signal to the actuator 114 via the pneumatic connection 118. In some such examples, the actuator 114 actuates the position of the valve 116 to a position associated with the 100% drive signal (e.g., a fully open valve 116). Further, the machine executable instructions 800 continue to block 828.

At block 814, the safety valve controller 106 transmits a 0% drive signal in response to the input signal (e.g., the input current measurement 202) being lower than the lower throttling threshold and/or cut-off. For example, the comparator circuit 212 transmits the 0% drive signal to the drive current control circuit 216, which delivers the 0% drive signal to the field device 104. In some examples, the field device 104 transmits the 0% drive signal to the actuator 114 via the pneumatic connection 118. In some such examples, the actuator 114 actuates the valve 116 to a position associated with the 0% drive signal (e.g., a fully closed valve 116). Further, the machine executable instructions 800 continue to block 828.

At block 816, the safety valve controller 106 modulates the drive signal based on the input signal in response to determining that the input signal is lower than the upper throttling threshold and/or cut-off. For example, the current modulating circuit 214 determines a modulated drive signal between the 0% and 100% drive signal based on the input signal. In some examples the current modulating circuit 214 transmits the modulated drive signal to the drive current control circuit 216, which delivers the modulated drive signal to the field device 104. In some examples, the field device 104 transmits the modulated drive signal to the actuator 114 via the pneumatic connection 118. In some examples, the actuator 114 actuates a position of the valve 116 based on the modulated drive signal. For example, the actuator 114 partially opens or closes the valve 116 based on the modulated drive signal to implement a modulated flow setting of the fluid flow control assembly 102.

At block 818, the safety valve controller 106 modulates the drive signal based on the input signal in response to determining that the input signal is higher than the lower throttling threshold and/or cut-off. For example, the current modulating circuit 214 determines a modulated drive signal between the 0% and 100% drive signal based on the input signal. In some examples, the current modulating circuit 214 transmits the modulated drive signal to the drive current control circuit 216, which delivers the modulated drive signal to the field device 104. In such examples, the field device 104 transmits the modulated drive signal to the actuator 114, which actuates a position of the valve 116 based on the modulated drive signal. For example, the actuator 114 partially opens or closes the valve 116 based on the modulated drive signal to implement a modulated flow setting of the fluid flow control assembly 102.

At block 828, the safety valve controller 106 determines whether to continue monitoring the fluid flow control assembly 102. For example, when the safety valve controller 106 is to continue monitoring the fluid flow control assembly 102, the machine executable instructions 800 return to block 804. In some examples, the safety valve controller 106 terminates monitoring the fluid flow control assembly 102.

Figure 9:
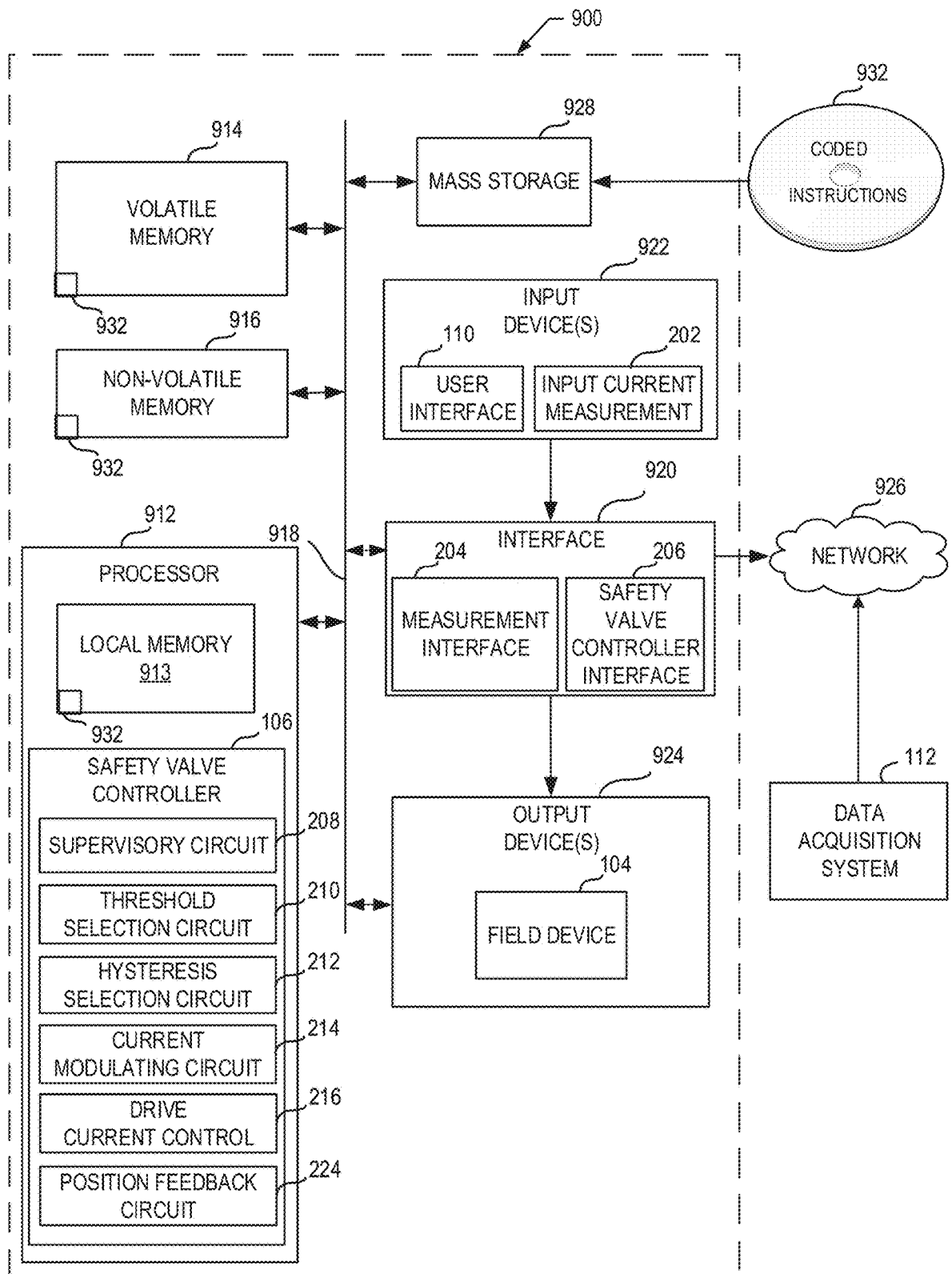
FIG. 9 is a flowchart representative of example machine readable instructions that may be executed to implement the example safety valve controller of FIGS. 1, 2, 3, and/or 4 to operate and/or otherwise control the fluid flow control assembly.

FIG. 9 is a block diagram of an example processor platform 900 structured to execute the instructions of FIGS. 7 and/or 8 to implement the safety valve controller 106 of FIGS. 1 and/or 2. The processor platform 900 can be, for example, a server, a personal computer, a process control system controller, a computing device of a process control system, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the example measurement interface 204, the example safely valve controller interface 206, the example supervisory circuit 208, the example threshold selection circuit 210, the example comparator circuit 212, the example current modulating circuit 214, the example drive current control circuit 216, and the example position feedback circuit 224.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface. In this example, the interface circuit 920 implements the measurement interface 204 of FIG. 2 and the safety valve controller interface 206 of FIG. 2.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, an isopoint device, and/or a voice recognition system. In this example, the one or more input devices 922 implement the user interface 110 of FIG. 1 and the input current measurement 202 of FIG. 2.

One or more output devices 924 are also connected to the interface circuit 920 of the illustrated example. Additionally or alternatively, the one or more output devices 924 may be connected to the bus 918. The output devices 924 can be implemented, for example, by display devices (e.g., a light emitting diode (LED), an organic light emitting diode (MED), a liquid crystal display (LCD), a cathode ray tube (CRT) display, an in-place switching OPS) display, a touchscreen, etc.), a tactile output device, a printer and/or speaker. The interface circuit 920 of the illustrated example, thus, typically includes a graphics driver card, a graphics driver chip and/or a graphics driver processor. In this example, the output devices 924 implements the field device 104 of FIGS. 1 and 2.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc. In this example the data acquisition system 112 of FIG. 1 is in communication with the network 926.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 7 and/or 8 may be stored in the mass storage device 928, in the volatile memory 914, in the non-volatile memory 916, and/or on a removable non-transitory computer readable storage medium such as a CD or DVD.

Figure 10:
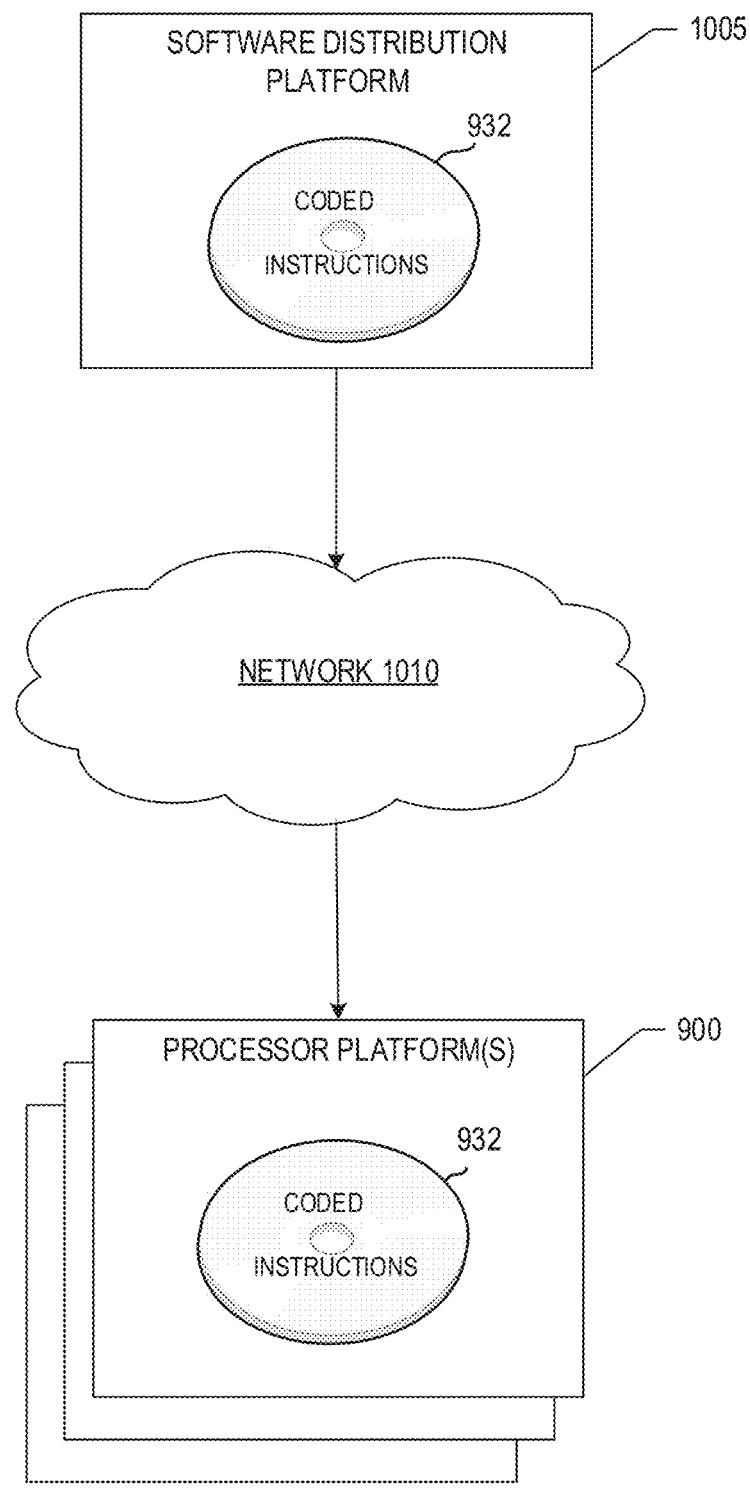
FIG. 10 is a block diagram of an example processing platform structured to execute the instructions of FIGS. 7, 8, and/or 9 to implement the safety valve controller of FIGS. 1 and 2.

A block diagram illustrating an example software distribution platform 1005 to distribute software such as the example machine executable instructions 932 of FIG. 9 to third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example machine executable instructions 932 of FIG. 9. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine executable instructions 932, which may correspond to the example machine executable instructions 700, 800 of FIGS. 7 and 8, as described above. The one or more servers of the example software distribution platform 1005 are in communication with a network 1010, which may correspond to any one or more of the Internet and/or any of the example networks 926 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the machine executable instructions 932 from the software distribution platform 1005. For example, the software, which may correspond to the example machine executable instructions 700, 800 of FIGS. 7 and 8, may be downloaded to the example processor platform 900, which is to execute the machine executable instructions 932 to implement the safety valve controller 106. In some examples, one or more servers of the software distribution platform 1005 periodically offer, transmit, and/or force updates to the software (e.g., the example machine executable instructions 932 of FIG. 11) to ensure improvements, patches, updates, etc. are distributed and applied to the software at the end user devices.

From the foregoing, it will be appreciated that example systems, methods, apparatus, and articles of manufacture have been disclosed that adjust operations of a fluid flow control assembly. The example systems, methods, apparatus, and articles of manufacture configure thresholds and/or cut-offs based on an input from a user interface. The example systems, methods, apparatus, and articles of manufacture enable the fluid flow control assembly to modulate associated flow settings responsive to configured thresholds not being satisfied and/or surpassed.

Example methods and apparatus to adjust operation of a fluid flow control assembly are disclosed herein. Further examples and combinations thereof include the following:

Example 1 includes a safety valve controller comprising comparator circuitry to compare a current measurement to at least one of a first threshold associated with a first flow setting of a fluid flow control assembly or a second threshold associated with a second flow setting of the fluid flow control assembly, and determine a first drive signal associated with the first flow setting or a second drive signal associated with the second flow setting in response to the current measurement satisfying a respective one of the first threshold or the second threshold, and current modulating circuitry to determine a third drive signal based on the current measurement, the third drive signal to modulate a flow setting of the fluid flow control assembly between the first flow setting and the second flow setting.

Example 2 includes the safety valve controller of example 1, further including an interface to receive at least one of (i) the first threshold and the first flow setting or (ii) the second threshold and the second flow setting from a network.

Example 3 includes the safety valve controller of example 2, further including an interface to receive at least one of the first threshold or the second threshold, the interface including one or more configurable switches.

Example 4 includes the safety valve controller of example 2, further including a threshold selection circuit coupled to the comparator circuitry, the threshold selection circuit to configure at least one of the first threshold associated with the first flow setting or the second threshold associated with the second flow setting based on at least one of the first threshold or the second threshold received by the interface.

Example 5 includes the safety valve controller of example 1, further including a drive current control circuit to receive at least one of (i) the first drive signal or the second drive signal from the comparator circuitry or (ii) the third drive signal from the current modulating circuitry, override the third drive signal from the current modulating circuitry in response to receiving the first drive signal or the second drive signal from the comparator circuitry, and deliver the first drive signal, the second drive signal, or the third drive signal to a field device to implement a respective one of the first flow setting, the second flow setting, or a modulated flow setting.

Example 6 includes the safety valve controller of example 1, wherein the first flow setting associated with the first drive signal or the second flow setting associated with the second drive signal transitions the fluid flow control assembly into a safe state.

Example 7 includes the safety valve controller of example 1, wherein the comparator circuitry is to configure at least one of (i) the first threshold to remove the first drive signal associated with the first flow setting or (ii) the second threshold to remove the second drive signal associated with the second flow setting.

Example 8 includes an apparatus comprising at least one memory device, and at least one processor to execute instructions to at least compare a current measurement to at least one of a first threshold associated with a first flow setting of a fluid flow control assembly or a second threshold associated with a second flow setting of the fluid flow control assembly, determine a first drive signal associated with the first flow setting or a second drive signal associated with the second flow setting when a respective one of the first threshold or the second threshold is satisfied, and determine a third drive signal based on the current measurement, the third drive signal to modulate a flow setting of the fluid flow control assembly between the first flow setting and the second flow setting.

Example 9 includes the apparatus of example 8, further including an interface to receive at least one of (i) the first threshold and the first flow setting or (ii) the second threshold and the second flow setting from a network.

Example 10 includes the apparatus of example 9, wherein the at least one processor is to configure at least one of the first threshold associated with the first flow setting of the fluid flow control assembly or the second threshold associated with the second flow setting of the fluid flow control assembly.

Example 11 includes the apparatus of example 8, further including an interface to receive at least one of the first threshold or the second threshold, the interface including one or more configurable switches.

Example 12 includes the apparatus of example 11, wherein the at least one processor is to configure at least one of the first threshold or the second threshold based on a configuration of the one or more configurable switches.

Example 13 includes the apparatus of example 8, wherein the at least processor is to receive at least one of the first drive signal, the second drive signal, or the third drive signal, override the third drive signal from the current modulating circuitry in response to receiving the first drive signal or the second drive signal from the comparator circuitry, and deliver the first drive signal, the second drive signal, or the third drive signal to a field device associated with the fluid flow control assembly.

Example 14 includes the apparatus of example 8, wherein the first flow setting associated with the first drive signal or the second flow setting associated with the second drive signal transitions the fluid flow control assembly into a safe state.

Example 15 includes the apparatus of example 8, wherein the at least one processor is to configure at least one of (i) the first threshold to remove the first drive signal associated with the first flow setting or (ii) the second threshold to remove the second drive signal associated with the second flow setting.

Example 16 includes a method for modulating a fluid flow control assembly, the method comprising comparing a current measurement to at least one of a first threshold associated with a first flow setting of a fluid flow control assembly or a second threshold associated with a second flow setting of a fluid flow control assembly, determining a first drive signal associated with the first flow setting or a second drive signal associated with the second flow setting when a respective one of the first threshold or the second threshold is satisfied, and determining a third drive signal based on the current measurement, the third drive signal to modulate a flow setting of the fluid flow control assembly between the first flow setting and the second flow setting.

Example 17 includes the method of example 16, further including receiving at least one of (i) the first threshold and the first flow setting or (ii) the second threshold and the second flow setting from a network.

Example 18 includes the method of example 17, further including configuring at least one of the first threshold associated with the first flow setting of the fluid flow control assembly or the second threshold associated with the second flow setting of the fluid flow control assembly.

Example 19 includes the method of example 16, further including receiving at least one of the first threshold or the second threshold from one or more configurable switches.

Example 20 includes the method of example 19, further including configuring at least one of the first threshold or the second threshold based on a configuration of the one or more configurable switches.

Example 21 includes the method of example 16, further including receiving at least one of the first drive signal, the second drive signal, or the third drive signal, overriding the third drive signal from the current modulating circuitry in response to receiving the first drive signal or the second drive signal from the comparator circuitry, and delivering the first drive signal, the second drive signal, or the third drive signal to a field device associated with the fluid flow control assembly.

Example 22 includes the method of example 16, wherein the first flow setting associated with the first drive signal or the second flow setting associated with the second drive signal transitions the fluid flow control assembly into a safe state.

Example 23 includes the method of example 16, further including configuring at least one of (i) the first threshold to remove the first drive signal associated with the first flow setting or (ii) the second threshold to remove the second drive signal associated with the second flow setting.

Example 24 includes an apparatus comprising a first switch having a first current terminal, a second current terminal, and a first gate terminal, a second switch having a third current terminal, a fourth current terminal, and a second gate terminal, a third switch having a fifth current terminal, a sixth current terminal, and a third gate terminal, the second current terminal of the first switch coupled to the sixth current terminal, the fourth current terminal of the second switch coupled to the third gate terminal, a first comparator having a first comparator input terminal, a second comparator input terminal, and a first comparator output terminal, the first comparator output terminal coupled to the first gate terminal of the first switch, and a second comparator having a third comparator input terminal, a fourth comparator input terminal, and a second comparator output terminal, the second comparator output terminal coupled to the second gate terminal of the second switch.

Example 25 includes the apparatus of example 24, wherein the first switch is a P-channel metal-oxide semiconductor field-effect transistor.

Example 26 includes the apparatus of example 24, wherein at least one of the first switch, the second switch, or the third switch are N-channel metal-oxide semiconductor field-effect transistors.

Example 27 includes the apparatus of example 24, further including a first resistor, a second resistor, a third resistor, a fourth resistor, a fifth resistor, and a sixth resistor, the first resistor coupled to the first comparator input terminal and the third comparator input terminal, the second resistor and the third resistor coupled to the second comparator input terminal, the fourth resistor and the fifth resistor coupled to the fourth comparator input terminal, the sixth resistor coupled to the fourth current terminal of the second switch and the third gate terminal of the third switch.

Example 28 includes the apparatus of example 27, wherein at least one of the third resistor or the fifth resistor are variable resistors.

Example 29 includes the apparatus of example 27, wherein at least one of (i) the third resistor has a first resistance responsive to configuring a first bank of resistors or (ii) the fifth resistor has a second resistance responsive to configuring a second bank of resistors.

Example 30 includes the apparatus of example 29, further including configurable switches coupled to at least one of the third resistor or the fifth resistor.

Example 31 includes the apparatus of example 30, further including a processor coupled to the bank of resistors of at least one of the third resistor or the fifth resistor.

Example 32 includes the apparatus of example 27, further including a processor coupled to the second comparator input terminal and the fourth comparator input terminal.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A safety valve controller comprising:
   comparator circuitry to:
   compare a current measurement to at least one of a first threshold associated with a first flow setting of a fluid flow control assembly or a second threshold associated with a second flow setting of the fluid flow control assembly, the current measurement representative of a state of operation in which the fluid flow control assembly is to operate, the first flow setting associated with a closed valve state of the fluid flow control assembly, the second flow setting associated with an open valve state in the fluid flow control assembly; and
   output a first drive signal associated with the first flow setting or a second drive signal associated with the second flow setting after a determination that the current measurement satisfies a respective one of the first threshold or the second threshold; and current modulating circuitry to output a third drive signal to control operation of the fluid flow control assembly based on the current measurement, the third drive signal to modulate a flow setting of the fluid flow control assembly between the first flow setting and the second flow setting.

2. The safety valve controller of claim 1, further including interface circuitry to receive at least one of (i) the first threshold and the first flow setting or (ii) the second threshold and the second flow setting from a network.

3. The safety valve controller of claim 2, further including interface circuitry to receive at least one of the first threshold or the second threshold, the interface circuitry to include one or more configurable switches.

4. The safety valve controller of claim 2, further including threshold selection circuitry coupled to the comparator circuitry, the threshold selection circuitry to configure at least one of the first threshold associated with the first flow setting or the second threshold associated with the second flow setting based on at least one of the first threshold or the second threshold received by the interface circuitry.

5. The safety valve controller of claim 1, further including drive current control circuitry to:
receive at least one of (i) the first drive signal or the second drive signal from the comparator circuitry or (ii) the third drive signal from the current modulating circuitry;
override the third drive signal from the current modulating circuitry with the first drive signal or the second drive signal after receiving the first drive signal or the second drive signal from the comparator circuitry; and
output the first drive signal, the second drive signal, or the third drive signal to a field device to implement a respective one of the first flow setting, the second flow setting, or a modulated flow setting.

6. The safety valve controller of claim 1, wherein the first flow setting associated with the first drive signal or the second flow setting associated with the second drive signal causes a transition of the fluid flow control assembly into a safe state.

7. The safety valve controller of claim 1, wherein the comparator circuitry is to configure at least one of (i) the first threshold to remove the first drive signal associated with the first flow setting or (ii) the second threshold to remove the second drive signal associated with the second flow setting.

8. An apparatus comprising:
at least one memory device;
machine-readable instructions; and
at least one processor to execute the machine-readable instructions to at least:
compare a current measurement to at least one of a first threshold associated with a first flow setting of a fluid flow control assembly or a second threshold associated with a second flow setting of the fluid flow control assembly, the current measurement representative of a state of operation in which the fluid flow control assembly is to operate, the first flow setting associated with a closed valve state of the fluid flow control assembly, the second flow setting associated with an open valve state in the fluid flow control assembly;
output a first drive signal associated with the first flow setting or a second drive signal associated with the second flow setting when a respective one of the first threshold or the second threshold is satisfied; and
output a third drive signal to control operation of the fluid flow control assembly based on the current measurement, the third drive signal to modulate a flow setting of the fluid flow control assembly between the first flow setting and the second flow setting.

9. The apparatus of claim 8, further including interface circuitry to receive at least one of (i) the first threshold and the first flow setting or (ii) the second threshold and the second flow setting from a network.

10. The apparatus of claim 9, wherein the at least one processor is to configure at least one of the first threshold associated with the first flow setting of the fluid flow control assembly or the second threshold associated with the second flow setting of the fluid flow control assembly.

11. The apparatus of claim 8, further including interface circuitry to receive at least one of the first threshold or the second threshold, the interface circuitry including one or more configurable switches.

12. The apparatus of claim 11, wherein the at least one processor is to configure at least one of the first threshold or the second threshold based on a configuration of the one or more configurable switches.

13. The apparatus of claim 8, wherein the at least one processor is to:
receive at least one of the first drive signal, the second drive signal, or the third drive signal;
override the third drive signal with the first drive signal or the second drive signal after receiving the first drive signal or the second drive signal; and
deliver the first drive signal, the second drive signal, or the third drive signal to a field device associated with the fluid flow control assembly.

14. The apparatus of claim 8, wherein the first flow setting associated with the first drive signal or the second flow setting associated with the second drive signal causes a transition of the fluid flow control assembly into a safe state.

15. The apparatus of claim 8, wherein the at least one processor is to configure at least one of (i) the first threshold to remove the first drive signal associated with the first flow setting or (ii) the second threshold to remove the second drive signal associated with the second flow setting.

16. A method for modulating a fluid flow control assembly, the method comprising:
comparing a current measurement to at least one of a first threshold associated with a first flow setting of the fluid flow control assembly or a second threshold associated with a second flow setting of the fluid flow control assembly, the current measurement representative of a state of operation in which the fluid flow control assembly is to operate, the first flow setting associated with a closed valve state of the fluid flow control assembly, the second flow setting associated with an open valve state in the fluid flow control assembly;
outputting a first drive signal associated with the first flow setting or a second drive signal associated with the second flow setting when a respective one of the first threshold or the second threshold is satisfied; and
outputting a third drive signal to control operation of the fluid flow control assembly based on the current measurement, the third drive signal to modulate a flow setting of the fluid flow control assembly between the first flow setting and the second flow setting.

17. The method of claim 16, further including receiving at least one of (i) the first threshold and the first flow setting or (ii) the second threshold and the second flow setting from a network.

18. The method of claim 17, further including configuring at least one of the first threshold associated with the first flow setting of the fluid flow control assembly or the second threshold associated with the second flow setting of the fluid flow control assembly.

19. The method of claim 16, further including receiving at least one of the first threshold or the second threshold from one or more configurable switches.

20. The method of claim 19, further including configuring at least one of the first threshold or the second threshold based on a configuration of the one or more configurable switches.

21. The method of claim 16, further including:
receiving at least one of the first drive signal, the second drive signal, or the third drive signal;
overriding the third drive signal with the first drive signal or the second drive signal after receiving the first drive signal or the second drive signal; and
delivering the first drive signal, the second drive signal, or the third drive signal to a field device associated with the fluid flow control assembly.

22. The method of claim 16, wherein the first flow setting associated with the first drive signal or the second flow setting associated with the second drive signal causes a transition of the fluid flow control assembly into a safe state.

23. The method of claim 16, further including configuring at least one of (i) the first threshold to remove the first drive signal associated with the first flow setting or (ii) the second threshold to remove the second drive signal associated with the second flow setting.

* * * * *